US012712675B2

(12) United States Patent
Selvanesan et al.

(10) Patent No.: US 12,712,675 B2
(45) Date of Patent: Aug. 18, 2026

(54) HARQ IN SIDELINK IN COVERAGE AND OUT-OF-COVERAGE SCENARIOS

(71) Applicant: Koninklijke Philips N.V., Eindhoven (NL)

(72) Inventors: Sarun Selvanesan, Berlin (DE); Baris Göktepe, Berlin (DE); Thomas Fehrenbach, Berlin (DE); Cornelius Hellge, Berlin (DE); Robin Thomas, Berlin (DE); Thomas Wirth, Berlin (DE); Thomas Schierl, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/646,816

(22) Filed: Apr. 26, 2024

(65) Prior Publication Data

US 2024/0283573 A1 Aug. 22, 2024

Related U.S. Application Data

(63) Continuation of application No. 17/168,796, filed on Feb. 5, 2021, now abandoned, which is a continuation (Continued)

(30) Foreign Application Priority Data

Aug. 9, 2018 (EP) .................................... 18188371

(51) Int. Cl.
*H04L 1/1812* (2023.01)
*H04B 7/06* (2006.01)

(Continued)

(52) U.S. Cl.
CPC ......... *H04L 1/1819* (2013.01); *H04B 7/0626* (2013.01); *H04B 7/0632* (2013.01);

(Continued)

(58) Field of Classification Search
CPC ... H04L 1/1819; H04L 1/0061; H04L 1/1896; H04L 5/0053; H04B 7/0626; H04W 76/11; H04W 4/40; H04W 76/27; H04W 72/23

(Continued)

(56) References Cited

U.S. PATENT DOCUMENTS 8,233,431 B2 7/2012 Pirskanen et al.
8,316,270 B2 11/2012 Chae et al.

(Continued)

FOREIGN PATENT DOCUMENTS

EP 3522592 A1 8/2019
JP 2017-509221 A 3/2017

(Continued)

OTHER PUBLICATIONS

U.S. Appl. No. 62/711,921, filed Jul. 30, 2018.*

(Continued)

*Primary Examiner* — Faisal Choudhury

(57) ABSTRACT

A wireless communication system includes a plurality of transceivers. The plurality of transceivers include at least a first transceiver and a second transceiver. The first transceiver and the second transceiver are configured for a sidelink communication with each other. The wireless communication system supports a retransmission protocol for the sidelink. The retransmission protocol enables the first transceiver to perform a retransmission for a data packet, responsive to an explicit or an implicit feedback from the second transceiver, which receives one or more data packets from the first transceiver, in case of a non-successful transmission of the data packet over the sidelink.

15 Claims, 14 Drawing Sheets

Related U.S. Application Data of application No. PCT/EP2019/071236, filed on Aug. 7, 2019.

(51) Int. Cl.

| | |
|---|---|
| ***H04L 1/00*** | (2006.01) |
| ***H04L 1/1867*** | (2023.01) |
| ***H04L 5/00*** | (2006.01) |
| ***H04W 4/40*** | (2018.01) |
| ***H04W 72/23*** | (2023.01) |
| ***H04W 76/11*** | (2018.01) |
| ***H04W 76/27*** | (2018.01) |
| *H04W 92/18* | (2009.01) |

(52) U.S. Cl.

CPC .......... *H04L 1/0061* (2013.01); *H04L 1/1896* (2013.01); *H04L 5/0053* (2013.01); *H04W 4/40* (2018.02); *H04W 72/23* (2023.01); *H04W 76/11* (2018.02); *H04W 76/27* (2018.02); *H04W 92/18* (2013.01)

(58) Field of Classification Search

USPC .......................................................... 370/329

See application file for complete search history.

(56) References Cited

U.S. PATENT DOCUMENTS

| | | | | |
|---|---|---|---|---|
| 9,615,329 | B2 | 4/2017 | Tabet et al. | |
| 11,641,570 | B2 * | 5/2023 | Wang .................... | H04W 76/27 370/329 |
| 2007/0268814 | A1 * | 11/2007 | Li .......................... | H04L 27/34 370/207 |
| 2011/0211522 | A1 * | 9/2011 | Chung .................... | H04L 5/001 370/328 |
| 2016/0066337 | A1 * | 3/2016 | Sartori .................. | H04W 76/14 370/329 |
| 2017/0012753 | A1 | 1/2017 | Hakseong et al. | |
| 2017/0127405 | A1 * | 5/2017 | Agiwal ................. | H04W 76/14 |
| 2017/0238296 | A1 | 8/2017 | Lee et al. | |
| 2018/0159668 | A1 * | 6/2018 | Phuyal .................. | H04L 1/1861 |
| 2018/0234973 | A1 * | 8/2018 | Lee ................... | H04W 72/0453 |
| 2019/0007176 | A1 * | 1/2019 | Ozturk .................. | H04L 1/1896 |
| 2019/0173612 | A1 | 6/2019 | Ryota et al. | |
| 2019/0182639 | A1 * | 6/2019 | Basu Mallick ....... | H04W 72/23 |
| 2020/0022112 | A1 | 1/2020 | Shinpei et al. | |
| 2020/0029318 | A1 * | 1/2020 | Guo ...................... | H04W 72/23 |
| 2020/0037343 | A1 * | 1/2020 | He ........................ | H04W 72/20 |
| 2020/0059766 | A1 * | 2/2020 | Kim ...................... | H04W 28/26 |
| 2020/0170002 | A1 * | 5/2020 | Lee ................... | H04W 72/0453 |
| 2020/0204329 | A1 | 6/2020 | Masato et al. | |
| 2020/0235851 | A1 * | 7/2020 | Mondelli .............. | H04L 1/1819 |
| 2021/0289473 | A1 * | 9/2021 | Chae ..................... | H04L 1/1819 |
| 2021/0314982 | A1 * | 10/2021 | Panteleev ............ | H04W 72/23 |

FOREIGN PATENT DOCUMENTS

| | | | |
|---|---|---|---|
| JP | 2018-029323 | A1 | 2/2018 |
| JP | 2018-056813 | | 4/2018 |
| WO | 2018/056108 | A1 | 3/2018 |
| WO | 2018062377 | A1 | 4/2018 |

OTHER PUBLICATIONS

U.S. Appl. No. 62/716,008, filed Aug. 8, 2018.*
2018.*

RP-180889, "Views on NR URLLC work in Rel-16", Huawei, HiSilicon, Jun. 11-14, 2018.

RP-181477, SID on Physical Layer Enhancements for NR URLLC, Huawei, HiSilicon, Nokia, Nokia Shanghai Bell, Jun. 11-14, 2018.

Huawei et al.: "Feedback information for sidelink link adaptation"; 3GPP Draft; R1-1712136, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), XP051314956, Retrieved from the Internet: URL:http://www.3gpp.org/ftp/Meetings_3GPP_SYNC/RANI/Docs/ [retrieved on Aug. 20, 2017].

LG Electronics: "Feasibility Study on LTE-based V2X Services", 3GPP Draft; RP-160789 V2X SI SR for RAN_72 V2, 3rd Generation Partnership Project (3GPP), Mobile Competence Centre; 650, Route Des Lucioles ; F-06921, Sophia-Antipolis Cedex; France; vol. TSG RAN, No. Busan, Korea; Jun. 13, 2016-Jun. 16, 2016, Jun. 7, 2016 (Jun. 7, 2016), XP051658648, Retrieved from the Internet: URL:http://www.3gpp.org/ftp/tsg%5Fran/TSG%5FRAN/TSGR%5F72/Docs/RP%2D160789%2Ezip [retrieved on Jun. 7, 2016].

3GPP TSG RAN WG1 Meeting #93 Busan, Korea "Discussion on Configured Grant for NR Unlicensed Operation" May 21-25, 2018.

Huawei, Hi Silicon, Views on 5G V2X Work in REL-16 3GPP TSG-RAN Meeting #80 RP-180890 Jun. 4, 2018 p. 1-12 Jun. 11-13, 2018.

Intel Corporation "Motivation for SI Study on NR Vehicular Services" 3GPP TSG-RAN Meeting #75 RP-170421, Mar. 18, 2018 p. 1-30 Mar. 6-9, 2017.

Masayuki Tabata Office Action for JP Application No. 2021-506672 Jul. 4, 2022 JPO, Japan.

* cited by examiner

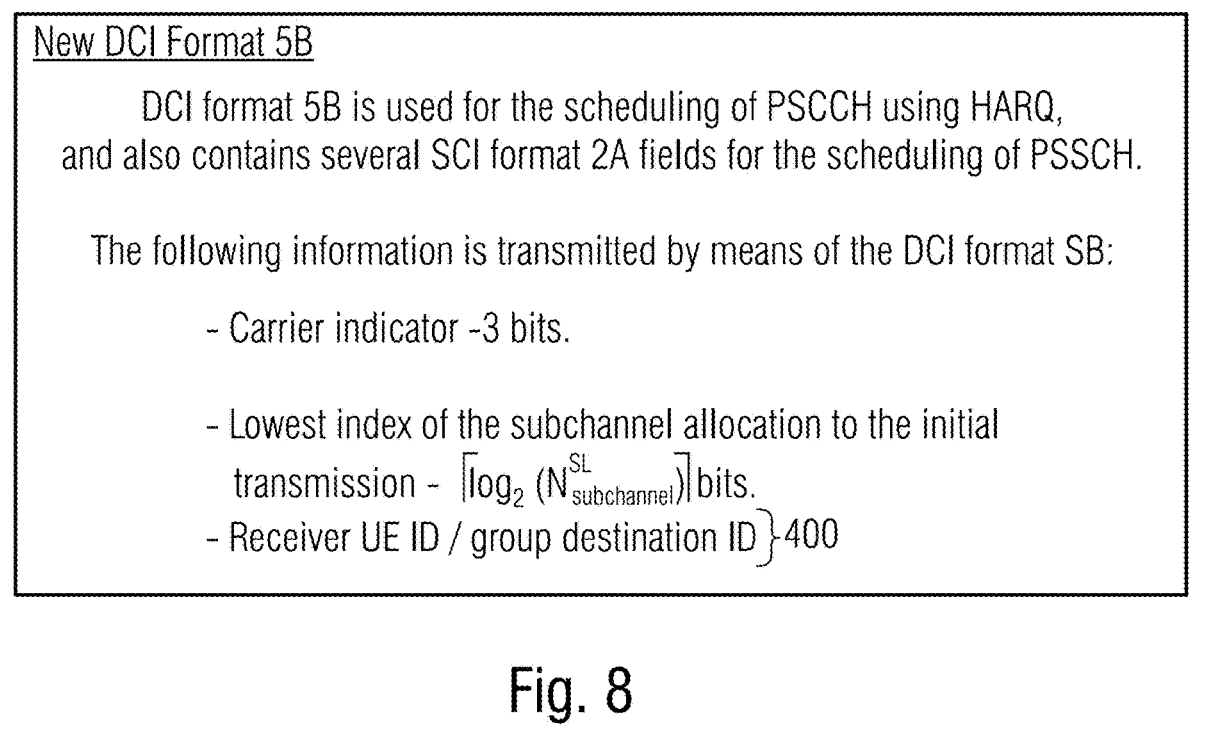

New DCI Format 5B

DCI format 5B is used for the scheduling of PSCCH using HARQ, and also contains several SCI format 2A fields for the scheduling of PSSCH.

The following information is transmitted by means of the DCI format SB:

- Carrier indicator -3 bits.
- Lowest index of the subchannel allocation to the initial transmission - $\lceil \log_2 (N^{SL}_{subchannel}) \rceil$ bits.
- Receiver UE ID / group destination ID } 400

Fig. 8

```
--ASN1START

SL-CommConfig-r12 ::=          SEQUENCE   {
   commTxResources-r12             CHOICE {
        release                       NULL,
        setup                         CHOICE {
           scheduled-r12              SEQUENCE {
                sl-RNTI-r12                          C-RNTI,
                mac-MainConfig-r12                   MAC MainConfigSL-r12,
                sc-CommTxConfig-r12                  SL-CommResourcePool-r12,
                mcs-r12                              INTEGER (0..28)          OPTIONAL   --
Need OP
           },
           ue-Selected-r12                SEQUENCE {
                -- Pool for normal usage
                commTxPoolNormalDedicated-r12     SEQUENCE {
                     poolToReleaseList-r12          SL-TxPoolToReleaseList-r12 OPTIONAL,  --
Need ON
                     poolToAddModList-r12           SL-CommTxPoolToAddModList-r12 OPTIONAL   --
Need ON
                }
           }
        }
   }

Need ON                                                                       OPTIONAL,  --
    ...,
MAC-MainConfigSL ::=    SEQUENCE  {
   periodic-BSR-TimerSL                        PeriodicBSR-Timer-r12        OPTIONAL,  -- Need ON
   retx-BSR-TimerSL                            RetxBSR-Timer-rl2
402 { maxHARQSL-Tx                             ENUMERATED {
                                                     n1, n2, n3, n4, n5, n6, n7, n8,
                                                     n10, n12, n16, n20, n24, n28,
                                                    spare2, spare1}OPTIONAL,         -- Need ON
}
-- ASN1STOP
```

Fig. 9

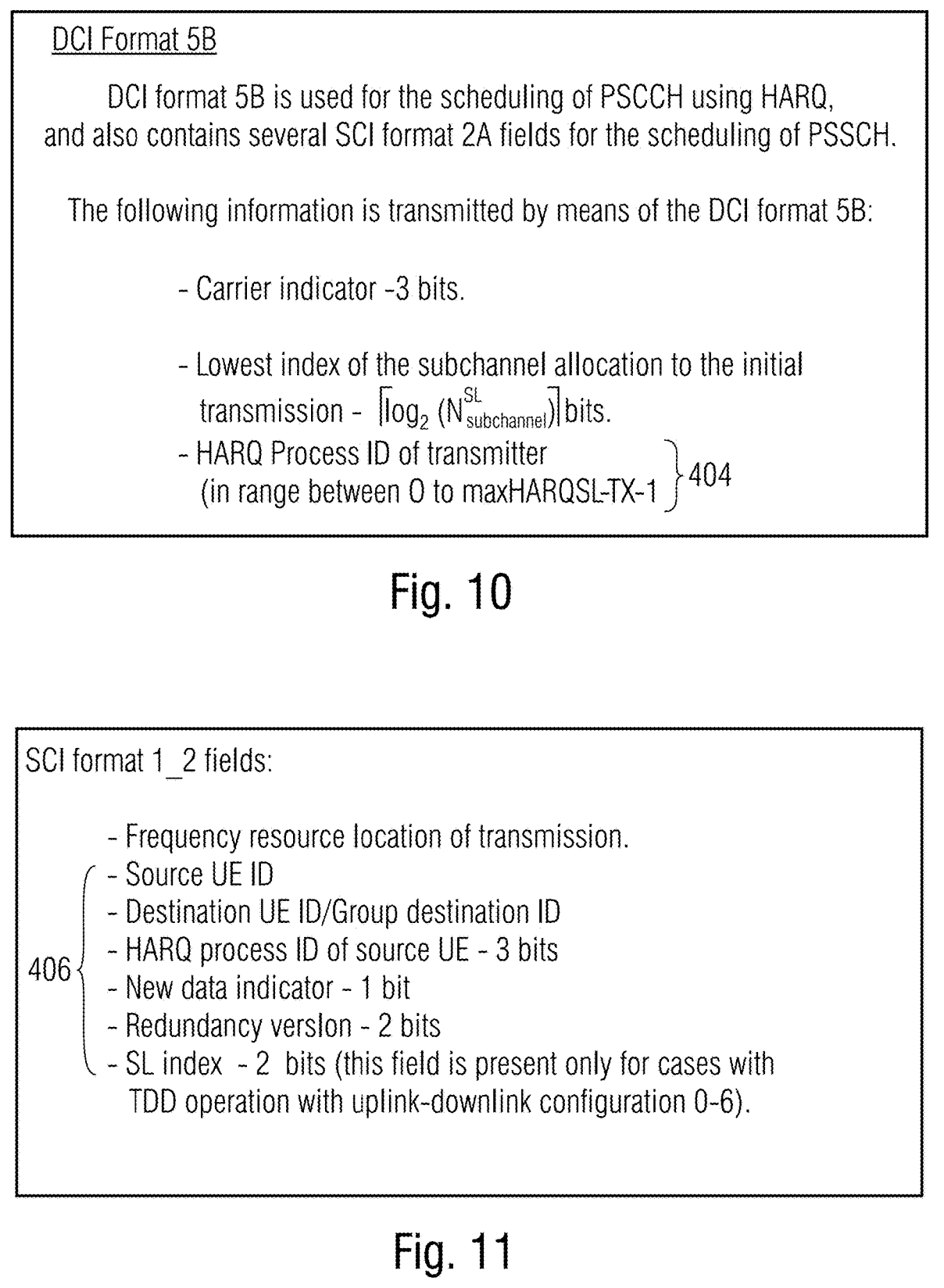

DCI Format 5B

DCI format 5B is used for the scheduling of PSCCH using HARQ, and also contains several SCI format 2A fields for the scheduling of PSSCH.

The following information is transmitted by means of the DCI format 5B:

- Carrier indicator -3 bits.
- Lowest index of the subchannel allocation to the initial transmission - $\lceil \log_2 (N^{SL}_{subchannel}) \rceil$ bits.
- HARQ Process ID of transmitter (in range between 0 to maxHARQSL-TX-1 } 404

Fig. 10

SCI format 1_2 fields:

- Frequency resource location of transmission.
- Source UE ID
- Destination UE ID/Group destination ID
- HARQ process ID of source UE - 3 bits
- New data indicator - 1 bit
- Redundancy version - 2 bits
- SL index - 2 bits (this field is present only for cases with TDD operation with uplink-downlink configuration 0-6).

```
PUCCH-Config ::= SEQUENCE {
resourceSetToAddModList SEQUENCE (SIZE (1..maxNrofPUCCH-ResourceSets)) OF PUCCH-ResourceSet
resourceSetToReleaseList SEQUENCE (SIZE (1..maxNrofPUCCH-ResourceSets)) OF PUCCH-ResourceSetId

resourceToAddModList SEQUENCE (SIZE (1..maxNrofPUCCH-Resources)) OF PUCCH-Resource
resourceToReleaseList SEQUENCE (SIZE (1..maxNrofPUCCH-Resources)) OF PUCCH-ResourceId

format1 SetupRelease   {  PUCCH-FormatConfig  }
format2 SetupRelease   {  PUCCH-FormatConfig  }
format3 SetupRelease   {  PUCCH-FormatConfig  }
format4 SetupRelease   {  PUCCH-FormatConfig  }

schedulingRequestResourceToAddModList SEQUENCE (SIZE (1..maxNrofSR-Resources)) OF
SchedulingRequestResourceConfig
schedulingRequestResourceToReleaseList SEQUENCE (SIZE (1..maxNrofSR-Resources)) OF
SchedulingRequestResourceId

multi-CSI-PUCCH-ResourceList SEQUENCE (SIZE (1..2)) OF PUCCH-ResourceId
d1-DataToUL-ACK SEQUENCE (SIZE (1..8)) OF INTEGER (0..15)
s1-DataToUL-ACK-max INTEGER (0..15)

spatialRelationInfoToAddModList SEQUENCE (SIZE (1..maxNrofSpatialRelationInfos)) OF PUCCH-
SpatialRelationInfo
spatialRelationInfoToReleaseList SEQUENCE (SIZE (1..maxNrofSpatialRelationInfos)) OF PUCCH -
SpatialRelationInfoId

pucch-PowerControl PUCCH-PowerControl
. . . }
```

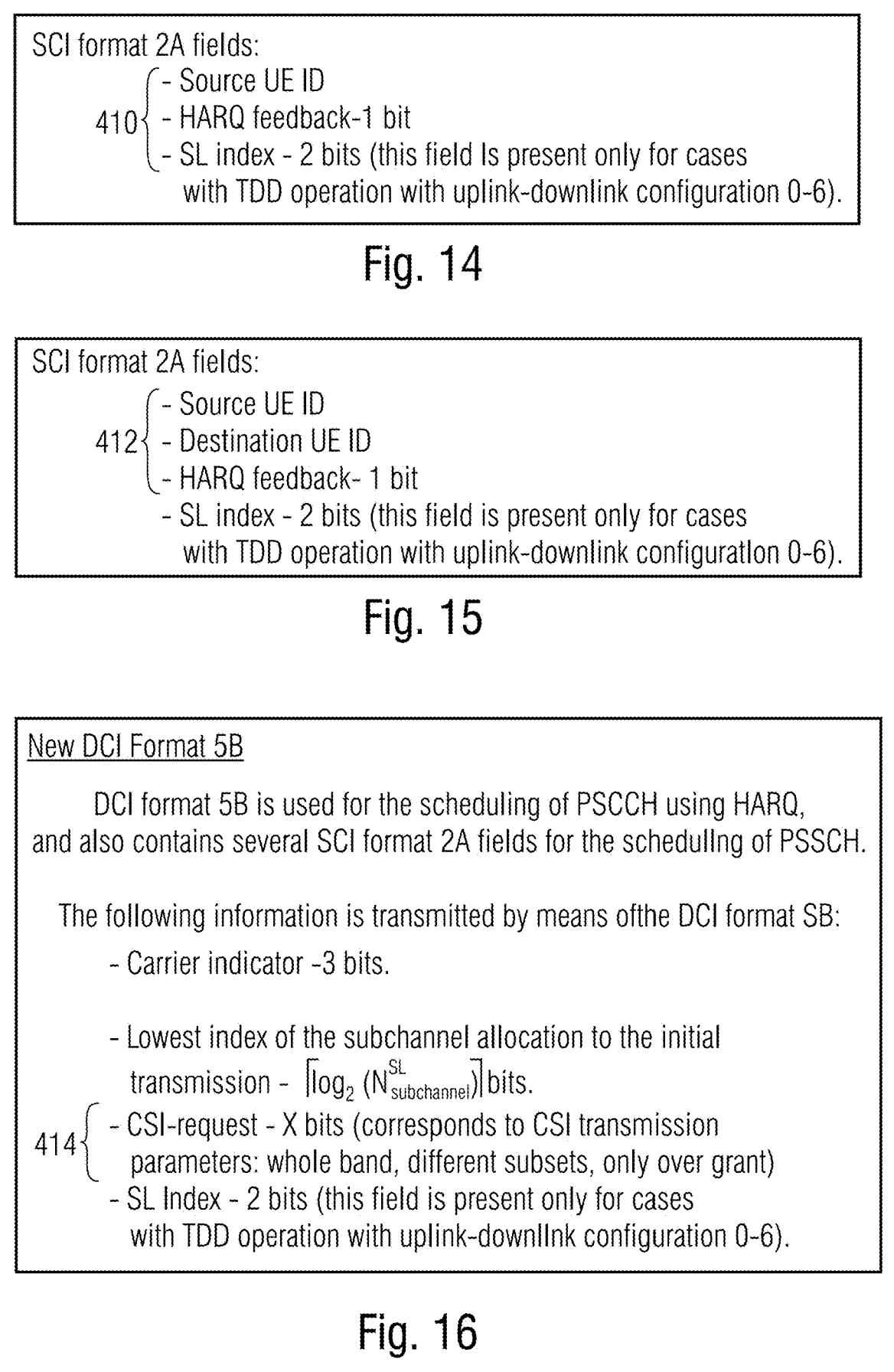

SCI format 2A fields:

410
- Source UE ID
- HARQ feedback-1 bit
- SL index - 2 bits (this field Is present only for cases with TDD operation with uplink-downlink configuration 0-6).

Fig. 14

SCI format 2A fields:

412
- Source UE ID
- Destination UE ID
- HARQ feedback- 1 bit
- SL index - 2 bits (this field is present only for cases with TDD operation with uplink-downlink configuratlon 0-6).

Fig. 15

New DCI Format 5B

DCI format 5B is used for the scheduling of PSCCH using HARQ, and also contains several SCI format 2A fields for the schedulIng of PSSCH.

The following information is transmitted by means ofthe DCI format SB:

- Carrier indicator -3 bits.
- Lowest index of the subchannel allocation to the initial transmission - $\lceil \log_2 (N^{SL}_{subchannel}) \rceil$ bits.

414
- CSI-request - X bits (corresponds to CSI transmission parameters: whole band, different subsets, only over grant)
- SL Index - 2 bits (this field is present only for cases with TDD operation with uplink-downlInk configuration 0-6).

Fig. 16

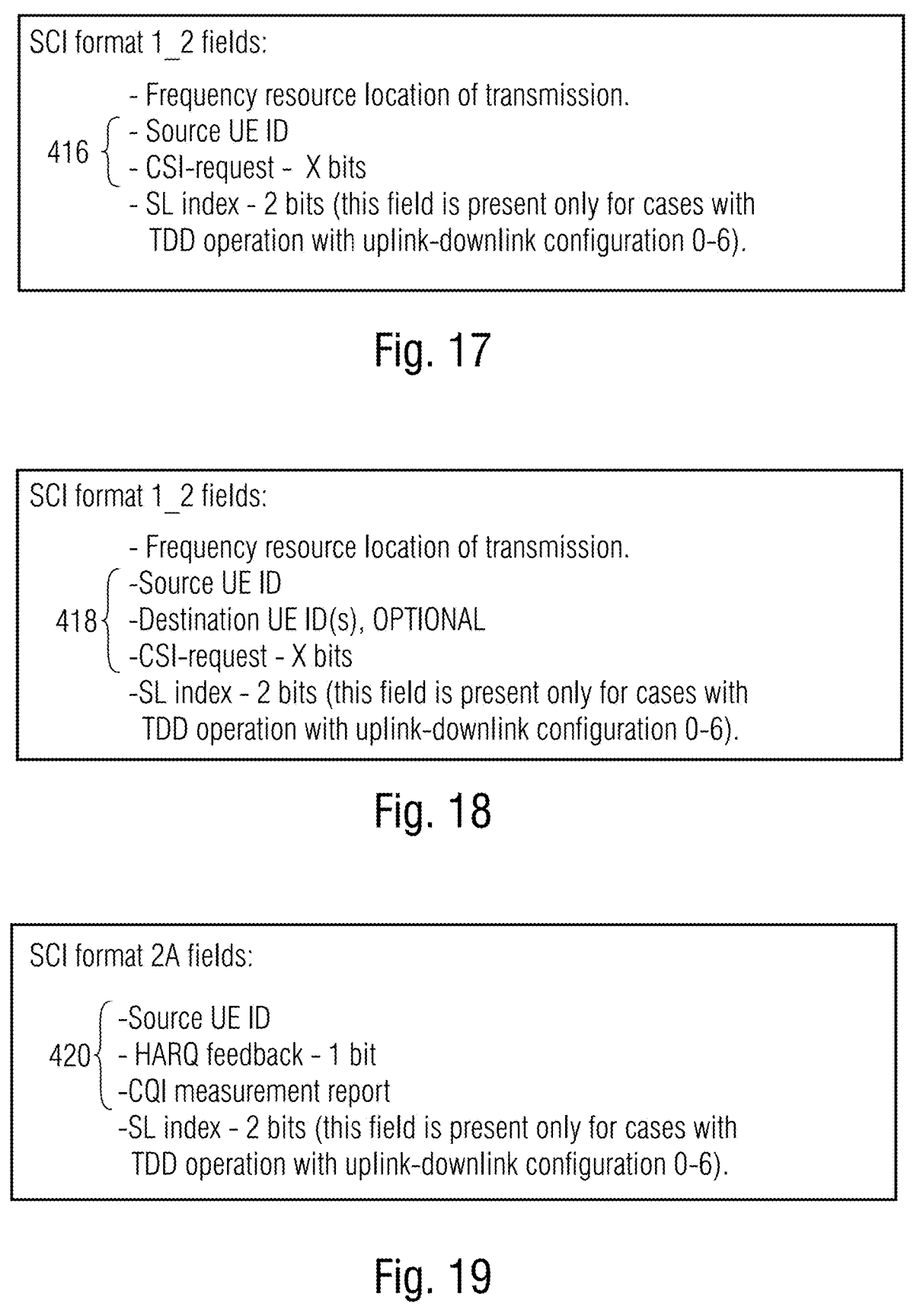

SCI format 1_2 fields:

- Frequency resource location of transmission.

416
- Source UE ID
- CSI-request - X bits

- SL index - 2 bits (this field is present only for cases with TDD operation with uplink-downlink configuration 0-6).

Fig. 17

SCI format 1_2 fields:

- Frequency resource location of transmission.

418
-Source UE ID
-Destination UE ID(s), OPTIONAL
-CSI-request - X bits

-SL index - 2 bits (this field is present only for cases with TDD operation with uplink-downlink configuration 0-6).

Fig. 18

SCI format 2A fields:

420
-Source UE ID
- HARQ feedback - 1 bit
-CQI measurement report

-SL index - 2 bits (this field is present only for cases with TDD operation with uplink-downlink configuration 0-6).

Fig. 19

HARQ IN SIDELINK IN COVERAGE AND OUT-OF-COVERAGE SCENARIOS

CROSS-REFERENCE TO RELATED APPLICATIONS

This application is a continuation of U.S. patent application Ser. No. 17/168,796 filed Feb. 5, 2021 which is a continuation of International Application No. PCT/EP2019/071236, filed Aug. 7, 2019, which is incorporated herein by reference in its entirety, and additionally claims priority from European Application No. 18188371.1, filed Aug. 9, 2018, which is also incorporated herein by reference in its entirety.

The present invention relates to the field of wireless communication networks or systems, more specifically to systems providing for a communication among users, like UEs, over a sidelink interface, like the PC5 interface. Embodiments relate to the implementation of a hybrid automatic repeat request process, hybrid ARQ or HARQ, for sidelink, SL, communications.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $\mathbf{106}_1$ to $\mathbf{106}_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g. via the S1 interface, via respective backhaul links $\mathbf{114}_1$ to $\mathbf{114}_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $\mathbf{116}_1$ to $\mathbf{116}_5$, which are schematically represented in FIG. 1 by the arrows pointing to "gNBs".

For data transmission a physical resource grid may be used. The physical resource grid may comprise a set of resource elements to which various physical channels and physical signals are mapped. For example, the physical channels may include the physical downlink, uplink shared channels and sidelink shared channel (PDSCH, PUSCH, PSCCH) carrying user specific data in unicast, also referred to as downlink, uplink payload data and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), uplink control information (UCI) and sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe has a duration of 1 ms and may include one or more slots of 14 OFDM symbols depending on the cyclic prefix (CP) length and subcarrier spacing. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by an heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In mobile communication networks, for example in a network like that described above with reference to FIG. 1, like a LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 3 configuration.

FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 4 configuration. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

In wireless communication networks or systems as described above with reference to FIG. 1, FIG. 2 or FIG. 3, providing for a sidelink, SL, communication among respective users, so far, only a retransmission operation has been implemented which may be referred to as a "blind retransmission". According to the blind retransmission scheme, the transmitter, like a sending UE, sends the same redundancy versions, RV, several times, for example in accordance with the device-to-device, D2D, standard three times or, in accordance with the V2X standard, once. However, this blind retransmission is done irrespective of whether a transmission of a data block from the sending UE to the receiver, the receiving UE, has been successful or not.

For example, in V2X communication systems, the downlink control information, DCI, message may have the format 5A and is sent from the base station to the UE. The DCI message defines whether a packet is to be retransmitted. This is indicated by the parameter $SF_{gap}$ specifying a time gap between an initial transmission and a retransmission. This parameter is broadcast by the transmitting UE to all receiving UEs using a sidelink control information, SCI, message. If the $SF_{gap}$ field is set to zero in the SCI message, no retransmission will occur. If the $SF_{gap}$ field in the SCI message is set to an integer value, the retransmission occurs in a subframe that follows the subframe of the initial transmission with a gap defined on the basis of the value of the $SF_{gap}$ parameter. For example, if the initial transmission is scheduled in subframe n, the retransmission occurs in subframe $n+SF_{gap}$. FIG. 4 illustrates the initial transmission and the blind retransmission in a conventional V2X broadcast system. A resource pool 300 is schematically illustrated representing the resources in time and frequency in the respective subframes that are allocated for the sidelink transmission by the system. The resource pool defines a control sub-channel 302 and a data sub-channel 304. The control sub-channel transmits respective control information, and the data sub-channel transmits the respective data over the sidelink. At subframe count "0", an initial transmission occurs so that n=0 and in case the parameter $SF_{gap}=4$, the retransmission will occur in subframe 4. In addition, the SCI, that may be transmitted on the control sub-channel 302, may contain another parameter called retransmission index, which indicates whether the transmission is an initial transmission or is a retransmission. If the parameter retransmission index is set to "0", an initial transmission is indicated. In case the retransmission index parameter is set to "1" the transmission is a retransmission of the initial transmission after the period $SF_{gap}$. This is also depicted in FIG. 4 illustrating for the initial transmission the retransmission index to be "0" and for the retransmission indicating the retransmission index to be "1".

The above-described approach for blind retransmissions is used when the transmitting UE broadcasts messages as any individual feedback for each transmission in a broadcast type communication may flood the system with acknowledgement/non-acknowledgment ACK/NACK, messages, or the potential receivers of the message are not a closed group, which is known to the transmitter. In case of groupcast/multicast or unicast communications, such unwarranted retransmissions, i.e., blind transmissions, will degrade the spectral efficiency of the sidelink, and there is also no proper mechanism allowing for a link adaption.

It is noted that the information in the above section is only for enhancing the understanding of the background of the invention and therefore it may contain information that does not form conventional technology that is already known to a person of ordinary skill in the art.

SUMMARY

According to an embodiment, a wireless communication system may have: a plurality of transceivers, the plurality of transceivers including at least a first transceiver and a second transceiver, the first transceiver and the second transceiver configured for a sidelink communication with each other, wherein the wireless communication system is configured to support a retransmission protocol for the sidelink, the retransmission protocol enabling the first transceiver to perform a retransmission for a data packet, responsive to an explicit or an implicit feedback from the second transceiver, which receives one or more data packets from the first transceiver, in case of a non-successful transmission of the data packet over the sidelink.

According to another embodiment, a wireless communication system may have: a plurality of transceivers, the plurality of transceivers including at least a first transceiver and a second transceiver, the first transceiver and the second transceiver configured for a sidelink communication with each other, wherein the wireless communication system is configured to support channel quality indicator, CQI, reporting based on past SL transmissions and/or channel state information reference symbols, like CSI-RS.

Another embodiment may have a transceiver, wherein the transceiver is configured to communicate in a wireless communication system with one or more further transceivers using a sidelink, receive one or more data packets from the further transceiver over the sidelink, and support a retransmission protocol for the sidelink, the retransmission protocol enabling the further transceiver to perform a retransmission for a data packet, responsive to an explicit or an implicit feedback from the transceiver, in case of a non-successful transmission of the data packet over the sidelink.

Another embodiment may have a transceiver, wherein the transceiver is configured to communicate in a wireless communication system with one or more further transceivers using a sidelink, transmit one or more data packets to the further transceiver over the sidelink, and support a retransmission protocol for the sidelink, the retransmission protocol enabling the transceiver to perform a retransmission for a data packet, responsive to an explicit or an implicit feedback from the further transceiver, in case of a non-successful transmission of the data packet over the sidelink.

Another embodiment may have a transceiver, wherein the transceiver is configured to communicate in a wireless communication system with one or more further transceivers using a sidelink, receive one or more data packets from the further transceiver over the sidelink, and provide to the further receiver a channel quality indicator, CQI, report based on past SL transmissions and/or channel state information reference symbols, like CSI-RS included in the SL transmissions.

Another embodiment may have a transceiver, wherein the transceiver is configured to communicate in a wireless communication system with one or more further transceivers using a sidelink, transmit one or more data packets to the further transceiver over the sidelink, and include into a SL transmission channel state information reference symbols, like CSI-RS, to enable the further receiver to return a channel quality indicator, CQI, report.

Another embodiment may have a base station, gNB, wherein the gNB is configured to serve a plurality of transceivers in a wireless communication system, the plurality of transceivers including at least a first transceiver and a second transceiver, configure the first transceiver and the second transceiver communicate with each other using a sidelink, and support a retransmission protocol for the sidelink, so as to enable the first transceiver, which transmits one or more data packets to the second transceiver over the sidelink, to perform a retransmission for a data packet, responsive to an explicit or an implicit feedback from the transceiver, in case of a non-successful transmission of the data packet.

Another embodiment may have a base station, gNB, wherein the gNB is configured to serve a plurality of transceivers in a wireless communication system, the plurality of transceivers including at least a first transceiver and a second transceiver, configure the first transceiver and the second transceiver communicate with each other using a sidelink, and support channel quality indicator, CQI, reporting based on past SL transmissions and/or channel state information reference symbols, like CSI-RS.

According to another embodiment, a method for a sidelink communication in a wireless communication system, the wireless communication system having a plurality of transceivers, the plurality of transceivers including at least a first transceiver and a second transceiver, the first transceiver and the second transceiver configured for a sidelink communication with each other, may have the step of: supporting a retransmission protocol for the sidelink, the retransmission protocol enabling the first transceiver to perform a retransmission for a data packet, responsive to an explicit or an implicit feedback from the second transceiver, which receives one or more data packets from the first transceiver, in case of a non-successful transmission of the data packet over the sidelink.

According to another embodiment, a method for a sidelink communication in a wireless communication system, the wireless communication system having a plurality of transceivers, the plurality of transceivers including at least a first transceiver and a second transceiver, the first transceiver and the second transceiver configured for a sidelink communication with each other, may have the steps of: supporting channel quality indicator, CQI, reporting based on past SL transmissions and/or channel state information reference symbols, like CSI-RS.

According to another embodiment, a method may have the steps of: communicating in a wireless communication system with one or more further transceivers using a sidelink, transmitting one or more data packets to the further transceiver over the sidelink, and supporting a retransmission protocol for the sidelink, the retransmission protocol enabling the transceiver to perform a retransmission for a data packet, responsive to an explicit or an implicit feedback from the further transceiver, in case of a non-successful transmission of the data packet over the sidelink.

According to another embodiment, a method may have the steps of: communicating in a wireless communication system with one or more further transceivers using a sidelink, receiving one or more data packets from the further transceiver over the sidelink, and providing to the further receiver a channel quality indicator, CQI, report based on past SL transmissions and/or channel state information reference symbols, like CSI-RS included in the SL transmissions.

According to another embodiment, a method may have the steps of: communicating in a wireless communication system with one or more further transceivers using a sidelink, transmitting one or more data packets to the further transceiver over the sidelink, and including into a SL transmission channel state information reference symbols, like CSI-RS, to enable the further receiver to return a channel quality indicator, CQI, report.

According to another embodiment, a method may have the steps of: serving a plurality of transceivers in a wireless communication system, the plurality of transceivers including at least a first transceiver and a second transceiver, configuring the first transceiver and the second transceiver communicate with each other using a sidelink, and supporting a retransmission protocol for the sidelink, so as to enable the first transceiver, which transmits one or more data packets to the second transceiver over the sidelink, to perform a retransmission for a data packet, responsive to an explicit or an implicit feedback from the transceiver, in case of a non-successful transmission of the data packet.

According to another embodiment, a method may have the steps of: serving a plurality of transceivers in a wireless communication system, the plurality of transceivers including at least a first transceiver and a second transceiver, configuring the first transceiver and the second transceiver communicate with each other using a sidelink, and supporting channel quality indicator, CQI, reporting based on past SL transmissions and/or channel state information reference symbols, like CSI-RS.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 8 illustrates a DCI format for scheduling a sidelink communication as explained above with reference to FIG. 7 in accordance with an embodiment of the present invention;

FIG. 9 illustrates an embodiment of a SL-CommConfig information element, IE, modified in accordance with embodiments of the inventive approach and indicating at 402 the above-mentioned maxHARQSL-Tx indicating the maximum number of transmissions for the SL HARQ;

FIG. 10 illustrates a DCI format modified in accordance with embodiments of the present invention to be used for scheduling;

FIG. 11 illustrates a SCI format modified in accordance with embodiments of the present invention for scheduling unicast/groupcast transmissions using HARQ over the sidelink FIG. 12 illustrates an RRC signaling as used in the inventive system which has been modified in accordance with embodiments of the present invention;

FIG. 14 illustrates a SCI format modified in accordance with embodiments of the present invention for HARQ feedback reporting for a unicast transmission;

FIG. 15 illustrates a SCI format modified in accordance with embodiments of the present invention for a HARQ feedback reporting a groupcast transmission;

FIG. 16 illustrates an example of a DCI format modified in accordance with embodiments of the present invention for issuing a CSI-RS together with the SL grant;

FIG. 17 illustrates a SCI format modified in accordance with embodiments of the present invention indicating the CSI-RS transmission;

FIG. 18 illustrates a SCI format modified in accordance with embodiments of the present invention for indicating a CSI-RS transmission;

FIG. 19 illustrates a SCI format modified in accordance with the embodiments of the present invention for a HARQ feedback and a CQI measurement reporting.

DETAILED DESCRIPTION OF THE INVENTION

Embodiments of the present invention are now described in more detail with reference to the accompanying drawings in which the same or similar elements have the same reference signs assigned.

Figure 1:
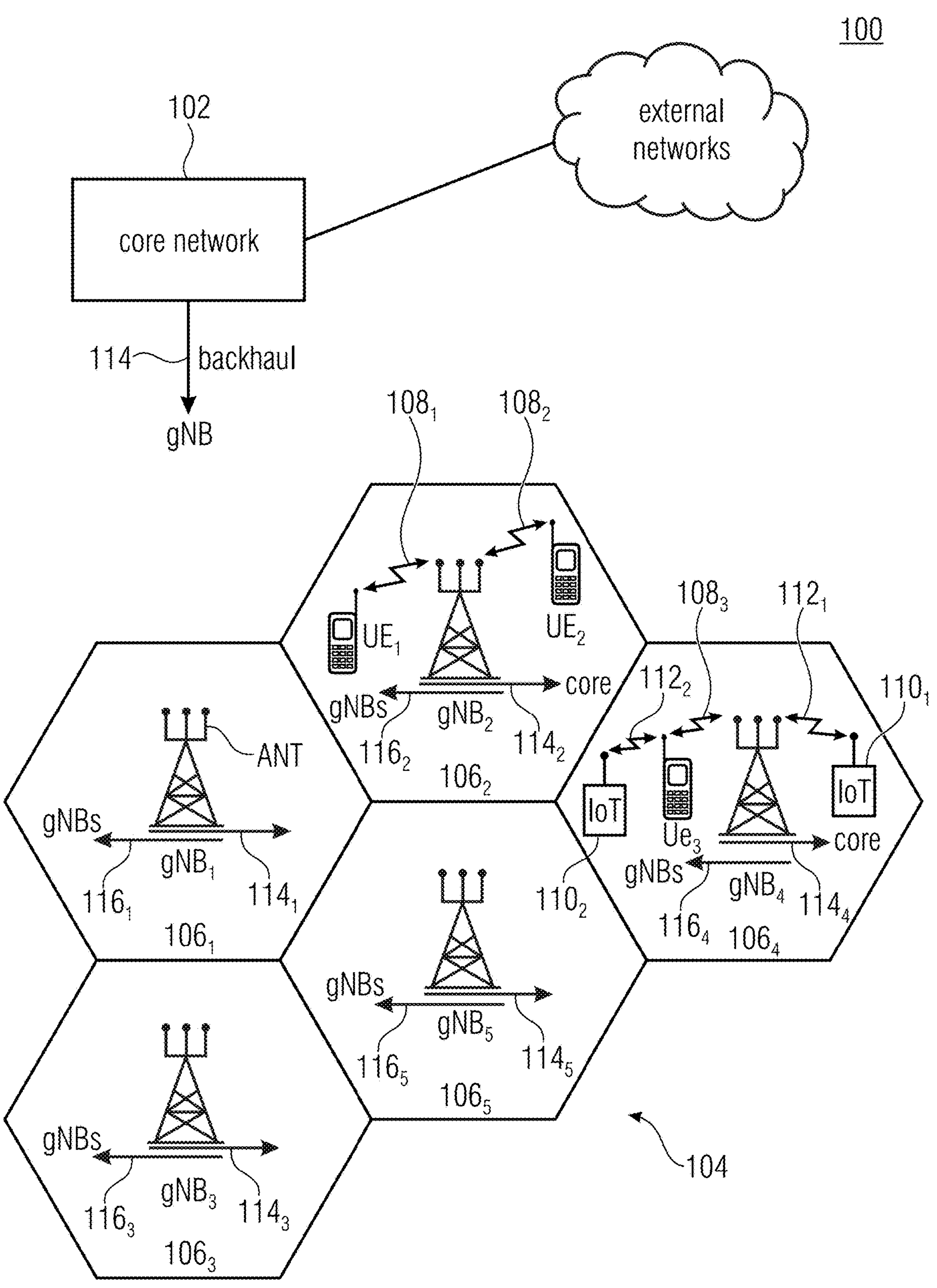
FIG. 1 shows a schematic representation of an example of a wireless communication system.
Figure 2:
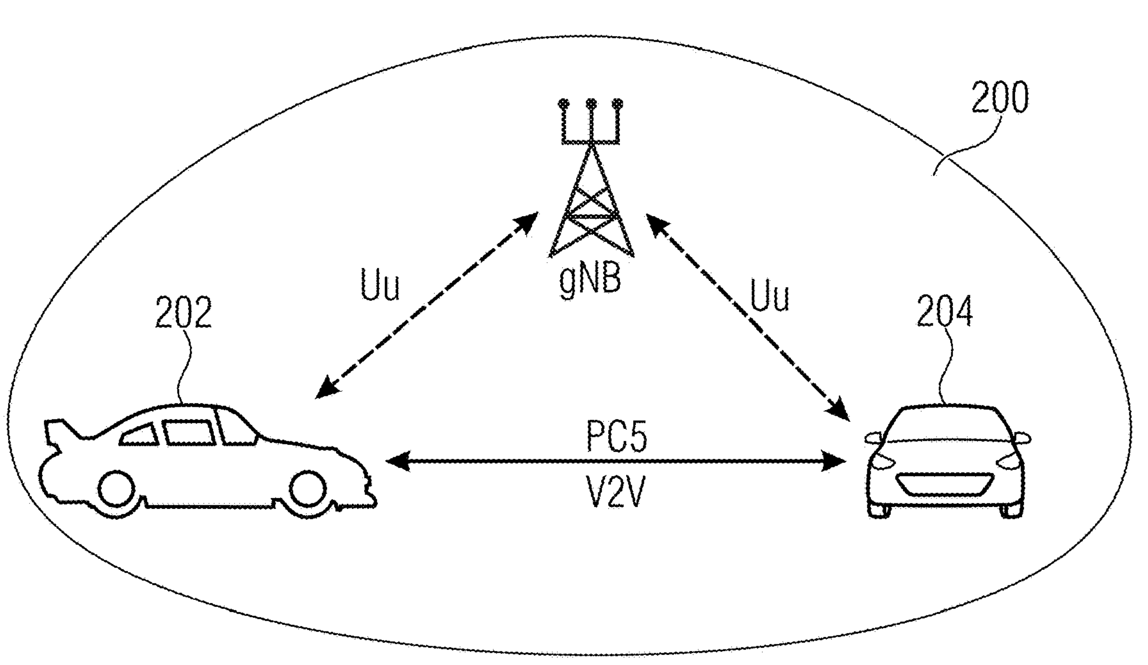
FIG. 2 shows a schematic representation of a situation in which UEs directly communicating with each other are in coverage of a base station.
Figure 3:
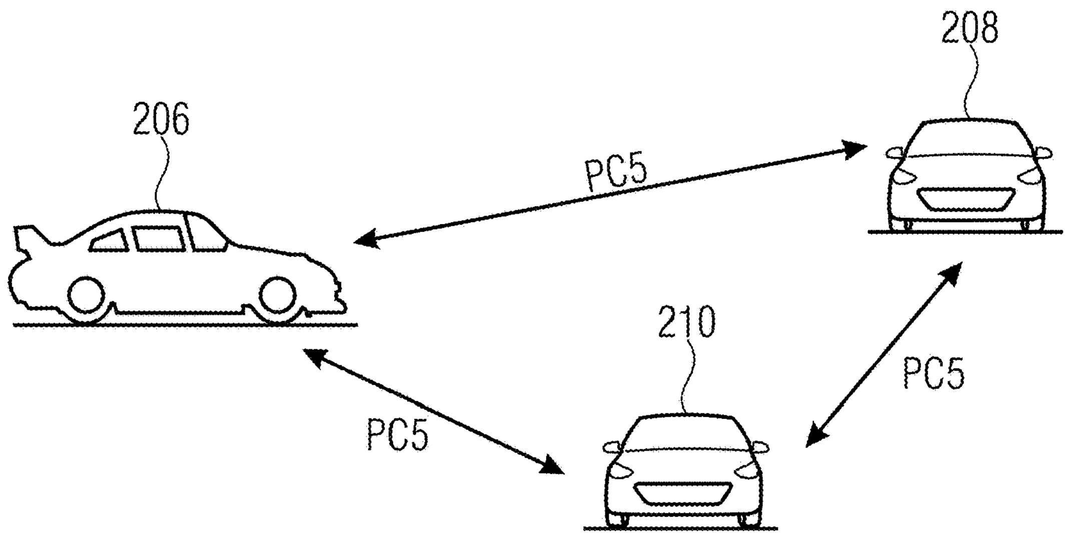
FIG. 3 shows a scenario in which UEs directly communicating with each other are not are not in coverage of a base station, i.e., are not connected to a base station.
Figure 4:
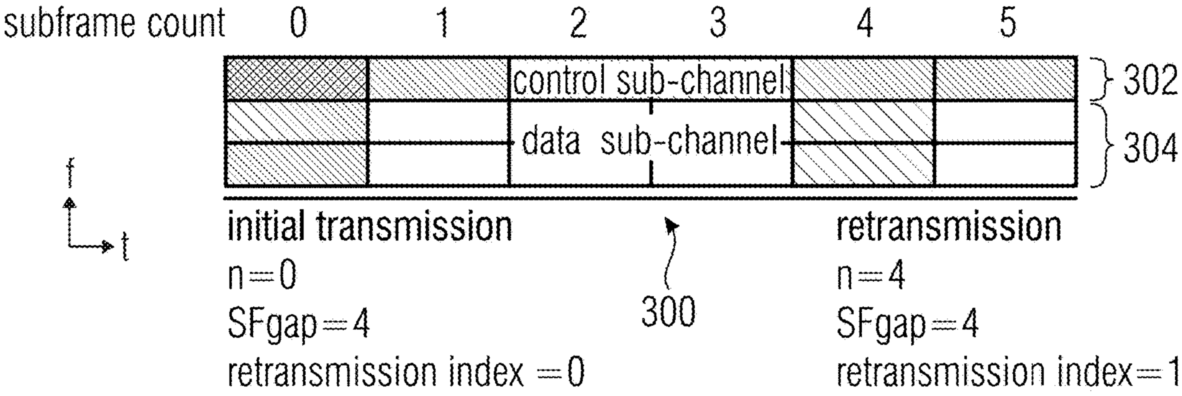
FIG. 4 illustrates an initial transmission and a blind retransmission in a conventional V2X broadcast system.
Figure 5:
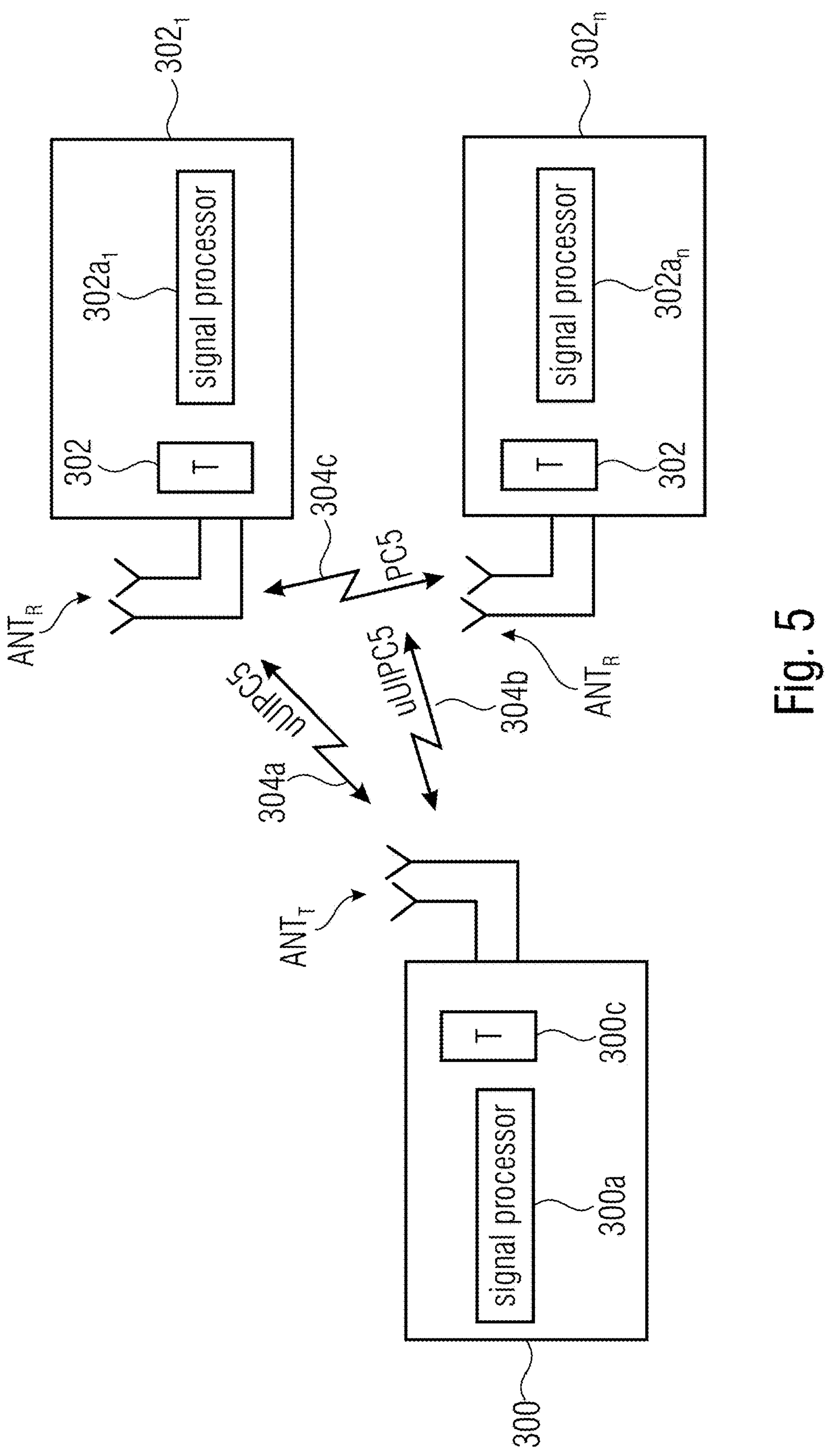
FIG. 5 is a schematic representation of a wireless communication system for communicating information between a transmitter and one or more receivers in accordance with embodiments of the present invention.

The present invention addresses the issue of a missing mechanism for actively requesting retransmissions over a sidelink in case of a non-successful transmission. This is addressed by the present invention as described hereinbelow in more detail, and embodiments of the present invention may be implemented in a wireless communication system as depicted in FIG. 1, FIG. 2 and FIG. 3 including base stations and users, like mobile terminals or IoT devices. FIG. 5 is a schematic representation of a wireless communication system for communicating information between a transmitter 300 and one or more receivers $\mathbf{302}_1$ to $\mathbf{302}_n$. The transmitter 300 and the receivers 302 may communicate via a wireless communication links or channels 304*a*, 304*b*, 304*c*, like a radio link. The transmitter 300 may include one or more antennas $ANT_T$ or an antenna array having a plurality of antenna elements, a signal processor 300*a* and a transceiver 300*b*, coupled with each other. The receivers 302 include one or more antennas $ANT_R$ or an antenna array having a plurality of antennas, a signal processor $\mathbf{302}a_1$, $\mathbf{302}a_n$, and a transceiver $\mathbf{302}b_1$, $\mathbf{302}b_n$ coupled with each other.

In accordance with an embodiment, as for example also depicted in FIG. 2, the transmitter 300 may be a base station and the receivers may be UEs. The base station 300 and the UEs 302 may communicate via respective first wireless communication links 304*a* and 304*b*, like a radio link using the Uu interface, while the UEs 302 may communicate with each other via a second wireless communication link 304*c*, like a radio link using the PC5 interface.

In accordance with an embodiment, as for example also depicted in FIG. 3, the transmitter 300 may be a first UE and the receivers may be further UEs. The first UE 300 and the further UEs 302 may communicate via respective wireless communication links 304*a* to 304*c*, like a radio link using the PC5 interface.

The system, the transmitter 300 and the one or more receivers 302 may operate in accordance with the inventive teachings described herein.

System Supporting HARQ on the Sidelink

The present invention provides a wireless communication system, comprising:

a plurality of transceivers, the plurality of transceivers including at least a first transceiver and a second transceiver, the first transceiver and the second transceiver configured for a sidelink communication with each other, wherein the wireless communication system is configured to support a retransmission protocol for the sidelink, the retransmission protocol enabling the first transceiver to perform a retransmission for a data packet, responsive to an explicit or an implicit feedback from the second transceiver, which receives one or more data packets from the first transceiver, in case of a non-successful transmission of the data packet over the sidelink.

In accordance with embodiments the retransmission protocol comprises a HARQ protocol, like the synchronous HARQ protocol or the asynchronous HARQ protocol.

In accordance with embodiments the plurality of transceivers includes at least a third transceiver, and the first transceiver is configured for a unicast transmission to the second transceiver over the sidelink, or for a multicast transmission to the second and third transceivers over the sidelinks.

Asynchronous HARQ

In accordance with embodiments the wireless communication system comprises at least one base station, gNB, wherein the transceivers comprise a plurality of user equipments, UEs, the plurality of UEs including at least a first UE and a second UE, the first and second UEs configured for a sidelink communication with each other, and wherein the gNB is configured to control the sidelink communication between the first and second UEs.

In accordance with embodiments the gNB is configured to schedule an initial transmission over the sidelink from the first UE to the second UE and to schedule, responsive to the request from the second UE, one or more retransmissions in an asynchronous manner, the second UE is configured to transmit to the gNB a non-acknowledgement message, NACK, in case of a non-successful transmission of the data packet over the sidelink, in case a NACK is received at the gNB, the gNB is configured to schedule automatically a next retransmission over the sidelink using the same or a different redundancy version, RV, of the data packet, the gNB indicating to the first UE for each transmission a HARQ process ID of the first UE, the second UE and the RV, and the first UE is configured to issue a sidelink control message, SCI, the SCI indicating the HARQ process ID of the first UE and the RV.

In accordance with embodiments the gNB further indicates to the first UE for each transmission a second UE ID.

In accordance with embodiments the second UE is configured to transmit to the gNB the NACK explicitly or implicitly, the implicit NACK comprises not sending an acknowledgement message, ACK within a defined time period following the transmission or retransmission.

In accordance with embodiments the second UE is configured to transmit to the gNB an acknowledgement message, ACK, in case of a successful transmission of the data packet over the sidelink.

In accordance with embodiments the second UE is configured to include into the ACK and NACK the HARQ process ID and the first UE ID, wherein the HARQ process ID may comprise the HARQ process ID provided by the gNB for the retransmission.

In accordance with embodiments the gNB is configured to wait a fixed or configured time to receive the ACK from the second UE, before to issuing the retransmission.

In accordance with embodiments the second UE is configured to bundle a plurality of HARQ feedbacks.

In accordance with embodiments the DCI indicates on or more of the following:

in case of a unicast transmission to the second UE over the sidelink, an identifier, ID, of the second UE, like a Radio Network Temporary Identifier, RNTI, explicitly or implicitly by CRC scrambling in case of a multicast transmission to a group of UEs over the sidelinks, a group destination ID, explicitly or implicitly by CRC scrambling the HARQ process ID to be used together with a sidelink resource allocation.

In accordance with embodiments the gNB is configured send a control message the second UE for configuring the asynchronous HARQ in the sidelink, the control message including an uplink control resource, like the PUCCH or the PUSCH, for the second UE for transmitting the ACK/NACK to the gNB.

Synchronous HARQ

In accordance with embodiments the gNB is configured to schedule an initial transmission over the sidelink from the first UE to the second UE and to configure the retransmissions, the second UE is configured to transmit to the gNB a non-acknowledgement message, NACK, in case of a non-successful transmission of the data packet over the sidelink, and following the initial transmission, the first UE is configured to continue with the retransmissions until an acknowledgement message, ACK, is received from the gNB or a maximum number of retransmissions is reached.

In accordance with embodiments the second UE is configured to transmit to the gNB the NACK explicitly or implicitly, the implicit NACK comprises not sending the ACK within a defined time period or at a certain time following the transmission or retransmission.

In accordance with embodiments the second UE is configured to include into the ACK and NACK the ID of the first UE.

In accordance with embodiments the gNB is configured send a control message to the second UE for configuring the synchronous HARQ in the sidelink, the control message including an uplink control resource, like the PUCCH or PUSCH, for the second UE for transmitting ACK/NACK to the gNB.

In accordance with embodiments the second UE is configured to bundle a plurality of HARQ feedbacks.

In accordance with embodiments the transceivers comprise a plurality of user equipments, UEs, the plurality of user UEs including at least a first UE and a second UE, the first and second UEs configured for a sidelink communication with each other and to schedule resources for the sidelink communication autonomously.

In accordance with embodiments the first UE is configured to schedule an initial transmission over the sidelink to the second UE, the second UE is configured to transmit to the first UE a non-acknowledgement message, NACK, in case of a non-successful transmission of the data packet over the sidelink, and following the initial transmission, the first UE is configured to continue with the retransmissions until an acknowledgement message, ACK, is received from the first UE or a maximum number of retransmissions is reached.

In accordance with embodiments the second UE is configured to transmit to the first UE the NACK explicitly or implicitly, the implicit NACK comprises not sending the ACK within a defined time period or at a certain time following the transmission or retransmission.

In accordance with embodiments a frequency resource and timing of the initial transmission uniquely maps to a PSCCH or physical sidelink shared channel (PSSCH) region for providing the feedback, and/or the feedback is provided with a SCI format including the HARQ feedback and the first UE ID, to allow the first UE to uniquely identify the feedback based on the first UE's ID and the feedback transmission timing.

In accordance with embodiments the first UE is configured to automatically retransmit a transport block, TB, according to a preconfigured or default RV order on the same frequency resources or a fixed or preconfigured hopping pattern according to a sidelink HARQ timeline, the sidelink HARQ timeline indicating a time of sending the feedback, and a time of sending the retransmission.

In accordance with embodiments the sidelink HARQ interval is different from a HARQ timeline, RTT, used of UL and DL communications, the sidelink HARQ interval being either fixed or semi-statically preconfigured, e.g., by an explicit RRC signaling for the sidelink.

In accordance with embodiments different sidelink HARQ timelines are signaled for specific transmissions, e.g. URLLC.

In accordance with embodiments a default sidelink HARQ timeline is configured or fixed for out-of-coverage and/or default operations.

In accordance with embodiments, in case of autonomous UEs which are configured to perform sensing to determine an available transmission location, the first UE is configured to extrapolate, using HARQ RTT, the HARQ RTT selected from a plurality of pre-configured HARQ RTTs, wherein the HARQ retransmission process may assume that the maximum number of retransmissions is used.

CQI Reporting on SL Transmissions

The present invention provides a wireless communication system, comprising:

a plurality of transceivers, the plurality of transceivers including at least a first transceiver and a second transceiver, the first transceiver and the second transceiver configured for a sidelink communication with each other, wherein the wireless communication system is configured to support channel quality indicator, CQI, reporting based on past SL transmissions and/or channel state information reference symbols, like CSI-RS.

In accordance with embodiments the gNB is configured to indicate, via a control channel together with a SL grant, to the first UE to transmit a CSI-RS on the whole or on a subset of the sidelink resources in a part of the duration of an assigned timeslot, and the first UE is configured to transmit the data and a CSI-RS, and to indicate the CSI-RS transmission in the corresponding SCI.

In accordance with embodiments the second UE is configured to include a CQI report in the HARQ feedback reporting to the gNB based on reference signals included in the associated transmission, the CQI report being transmitted on the PUCCH together with information of the first and second UEs.

In accordance with embodiments the CQI report is activated, e.g., by RRC signaling and/or by the CSI-RS transmission indicated in the corresponding SCI.

In accordance with embodiments the first UE is configured to use a dedicated timeslot or resource to transmit a CSI-RS on the sidelink, the dedicated timeslot or resource being granted by the gNB or being sensed autonomously.

In accordance with embodiments the wireless communication system provides buffer status report, BSR, indicating an amount of data in a buffer per destination per logical channel group.

In accordance with embodiments the UE or transceiver comprise one or more of a mobile terminal, or stationary terminal, or cellular IoT-UE, or an IoT device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, and the gNB comprise one or more of a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

UE/gNB Support HARQ on the Sidelink

The present invention provides a transceiver, wherein the transceiver is configured to communicate in a wireless communication system with one or more further transceivers using a sidelink, receive one or more data packets from the further transceiver over the sidelink, and support a retransmission protocol for the sidelink, the retransmission protocol enabling the further transceiver to perform a retransmission for a data packet, responsive to an explicit or an implicit feedback from the transceiver, in case of a non-successful transmission of the data packet over the sidelink.

The present invention provides a transceiver, wherein the transceiver is configured to communicate in a wireless communication system with one or more further transceivers using a sidelink, transmit one or more data packets to the further transceiver over the sidelink, and support a retransmission protocol for the sidelink, the retransmission protocol enabling the transceiver to perform a retransmission for a data packet, responsive to an explicit or an implicit feedback from the further transceiver, in case of a non-successful transmission of the data packet over the sidelink.

The present invention provides a transceiver, wherein the transceiver is configured to communicate in a wireless communication system with one or more further transceivers using a sidelink, receive one or more data packets from the further transceiver over the sidelink, and provide to the further receiver a channel quality indicator, CQI, report based on past SL transmissions and/or channel state information reference symbols, like CSI-RS included in the SL transmissions.

The present invention provides a transceiver, wherein the transceiver is configured to communicate in a wireless communication system with one or more further transceivers using a sidelink, transmit one or more data packets to the further transceiver over the sidelink, and include into a SL transmission channel state information reference symbols, like CSI-RS, to enable the further receiver to return a channel quality indicator, CQI, report.

The present invention provides a base station, gNB, wherein the gNB is configured to serve a plurality of transceivers in a wireless communication system, the plurality of transceivers including at least a first transceiver and a second transceiver, configure the first transceiver and the second transceiver communicate with each other using a sidelink, and support a retransmission protocol for the sidelink, so as to enable the first transceiver, which transmits one or more data packets to the second transceiver over the sidelink, to perform a retransmission for a data packet, responsive to an explicit or an implicit feedback from the transceiver, in case of a non-successful transmission of the data packet.

The present invention provides a base station, gNB, wherein the gNB is configured to serve a plurality of transceivers in a wireless communication system, the plurality of transceivers including at least a first transceiver and a second transceiver, configure the first transceiver and the second transceiver communicate with each other using a sidelink, and support channel quality indicator, CQI, reporting based on past SL transmissions and/or channel state information reference symbols, like CSI-RS.

Methods

The present invention provides a method for a sidelink communication in a wireless communication system, the wireless communication system comprising a plurality of transceivers, the plurality of transceivers including at least a first transceiver and a second transceiver, the first transceiver and the second transceiver configured for a sidelink communication with each other, and the method comprising:

supporting a retransmission protocol for the sidelink, the retransmission protocol enabling the first transceiver to perform a retransmission for a data packet, responsive to an explicit or an implicit feedback from the second transceiver, which receives one or more data packets from the first transceiver, in case of a non-successful transmission of the data packet over the sidelink.

The present invention provides a method for a sidelink communication in a wireless communication system, the wireless communication system comprising a plurality of transceivers, the plurality of transceivers including at least a first transceiver and a second transceiver, the first transceiver and the second transceiver configured for a sidelink communication with each other, and the method comprising:

supporting channel quality indicator, CQI, reporting based on past SL transmissions and/or channel state information reference symbols, like CSI-RS.

The present invention provides a method, comprising:

communicating in a wireless communication system with one or more further transceivers using a sidelink, transmitting one or more data packets to the further transceiver over the sidelink, and supporting a retransmission protocol for the sidelink, the retransmission protocol enabling the transceiver to perform a retransmission for a data packet, responsive to an explicit or an implicit feedback from the further transceiver, in case of a non-successful transmission of the data packet over the sidelink.

The present invention provides a method, comprising communicating in a wireless communication system with one or more further transceivers using a sidelink, receiving one or more data packets from the further transceiver over the sidelink, and providing to the further receiver a channel quality indicator, CQI, report based on past SL transmissions and/or channel state information reference symbols, like CSI-RS included in the SL transmissions.

The present invention provides a method, comprising:

communicating in a wireless communication system with one or more further transceivers using a sidelink, transmitting one or more data packets to the further transceiver over the sidelink, and including into a SL transmission channel state information reference symbols, like CSI-RS, to enable the further receiver to return a channel quality indicator, CQI, report.

The present invention provides a method, comprising:

serving a plurality of transceivers in a wireless communication system, the plurality of transceivers including at least a first transceiver and a second transceiver, configuring the first transceiver and the second transceiver communicate with each other using a sidelink, and supporting a retransmission protocol for the sidelink, so as to enable the first transceiver, which transmits one or more data packets to the second transceiver over the sidelink, to perform a retransmission for a data packet, responsive to an explicit or an implicit feedback from the transceiver, in case of a non-successful transmission of the data packet.

The present invention provides a method, comprising:

serving a plurality of transceivers in a wireless communication system, the plurality of transceivers including at least a first transceiver and a second transceiver, configuring the first transceiver and the second transceiver communicate with each other using a sidelink, and supporting channel quality indicator, CQI, reporting based on past SL transmissions and/or channel state information reference symbols, like CSI-RS.

Computer Program Product

The present invention provides a computer program product comprising instructions which, when the program is executed by a computer, causes the computer to carry out one or more methods in accordance with the present invention.

In accordance with embodiments of the present invention, improvements for the transmission of data over sidelinks, i.e., for a direct communication from one user device to another user device in a wireless communication are provided. The initial vehicle-to-everything, V2X, specification was included in release 14 of the 3GPP standard, and the basis for the design was the original device-to-device, D2D, communication standard with a modified scheduling and assignment of the resources in view of the V2X requirements. As described above, cellular V2X services may operate in accordance with two configurations from a resource allocation perspective, namely, the mode 3 and mode 4 configurations (see FIGS. 2 and 3). The V2X mode 3 configuration involves the scheduling and interference management of resources by the base station for vehicular UEs within the coverage of the base station so as to enable sidelink vehicle-to-vehicle, V2V, communications, for example. The control signaling to the UE is performed over the Uu interface via a downlink control indicator, DCI, and is dynamically assigned by the base station. In the V2X mode 4 configuration, the scheduling and interference management of resources is autonomously performed using distributed or de-centralized algorithms among the UEs, for example, based on a pre-configured resources configuration.

Upcoming developments in the V2X field include services or use cases for which multicast/groupcast and/or unicast communications may need to be enabled, so as to enhance, for example, reliability and reduce, for example, latency. As described, multicast/groupcast and unicast communications are not featured in previous releases, and given the fact that SL transmissions may be affected by strong variations in the channel and insufficient capabilities for channel estimation, the present invention provides a feedback mechanism allowing a receiving UE to directly request from the transmitting UE a retransmission in case of a non-successful transmission over the sidelink. The inventive approach is advantageous as it avoids unwarranted retransmissions that may occur in conventional approaches when applying the blind retransmissions. Further transmission over the sidelink are no longer limited to broadcast messages. Moreover, the possibility of transmitting data to one or more devices of a high number of devices does not need all of the devices to observe the sidelink channels regularly, rather, in accordance with the inventive approach, the dedicated retransmission mechanism allows the sending UE to monitor the sidelink over which such a transmission took place, for an acknowledgement or a non-acknowledgement from the receiving UE and to then, dependent on the received feedback, consider a further transmission or a retransmission.

Figure 6:
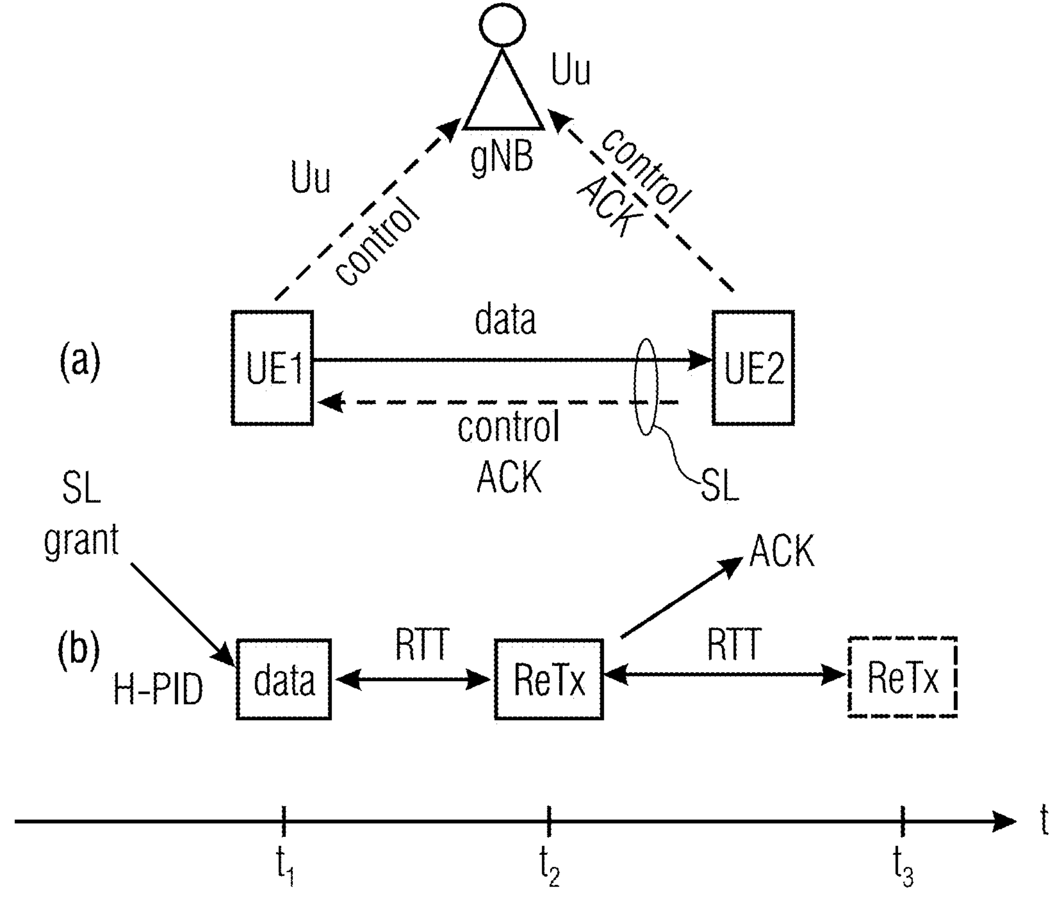
FIG. 6 is a schematic illustration of a sidelink HARQ communication in accordance with embodiments of the present invention, wherein FIG. 6(*a*) illustrates, schematically, a part of a wireless communication system, and FIG. 6(*b*) illustrates the transmissions in a system of FIG. 6(*a*) over the time.

FIG. 6 is a schematic illustration of a sidelink HARQ communication in accordance with embodiments of the present invention. FIG. 6(*a*) illustrates, schematically, a part of a wireless communication system, like the wireless communication system described above with reference to FIG. 1, FIG. 2 or FIG. 3 implementing embodiments of the present invention, and FIG. 6(*b*) illustrates the transmissions in a system of FIG. 6(*a*) over the time. The wireless communication system comprises a base station gNB, a first user equipment UE1, and a second user equipment, UE2. UE1 and UE2 communicate with each other over the sidelink SL, using, for example, the PC5 interface. UE1 and UE 2 are also connected to the gNB via the Uu interface. The system schedules for the sidelink communication a set of resources so as to allow transmitting data over the sidelink SL. The system a retransmission mechanism, like a HARQ mechanism, for a data transmission over the sidelink SL. It is assumed that UE1 is the transmitting UE, and that UE2 is the receiving UE. As is indicated in FIG. 6(*b*) upon receiving a SL grant from the gNB the UE1 transmits data over the SL to the UE2. Via a control channel an acknowledgement may be sent to the UE1 which, in case it is not received or in case an explicit non-acknowledgement message is received, causes a retransmission. In FIG. 6(*b*), it is assumed that at the time $t_1$, an initial transmission of data occurs and after the retransmission time interval, like the roundtrip time, RTT, in case no acknowledgement has been received within the HARQ feedback timing which is before the RTT, a retransmission is performed by UE1 at time $t_2$. In case an acknowledgement is provided within the HARQ feedback timing following the time $t_2$, new data may be transmitted from the UE1 to the UE2 at time $t_3$, if data is still to be transmitted. If there is no acknowledgement received, within the HARQ feedback timing following $t_2$ another retransmission may be carried out.

Although FIG. 6 illustrates only a sidelink communication from UE1 to UE2, namely a unicast communication, the present invention is not limited to such scenarios, rather, multicast or groupcast communications may also be implemented, for example, UE1 transmits data over respective sidelink channels to UE2 and to one or more additional UEs not depicted in FIG. 6.

In accordance with embodiments, the system of FIG. 6 may be an asynchronous HARQ system or a synchronous HARQ system.

In accordance with embodiment, an asynchronous HARQ system may be implemented for in-coverage scenarios in which the respective UEs are controlled by a gNB, for example via the respective Uu interfaces depicted in FIG. 6(*a*). The gNB may initially schedule both the sidelink communication and the retransmissions, the retransmissions being schedule in an asynchronous manner. The gNB may automatically schedule the next retransmission using the same or a different redundancy version, RV, in case the gNB does not receive from the receiving UE2 an explicit acknowledgement message ACK. The gNB may freely control the HARQ processes of the transmitting UE1 and the receiving UE2. For each transmission a HARQ process ID of the transmitting UE, and the redundancy version may be signaled. Additionally, the gNB may also signal the receiving UE ID or a radio network temporary identifier (RNTI) associated to the receiving UE. Further, in the sidelink control message, like the SCI, which is issued by the transmitting UE1, the HARQ process ID of the transmitting UE, the receiving UE ID or an associated RNTI and the redundancy version may be signaled. Optionally, the receiving UE ID or RNTI may be signaled implicitly by CRC scrambling. The gNB, before issuing the retransmission, may wait for a fixed or configured time for receiving the acknowledgement message from the receiving UE2.

In accordance with further embodiment, a synchronous HARQ system may be implemented for an in-coverage scenario and for an out-of-coverage scenario. In the in-coverage scenario, the synchronous HARQ operation is supported by the gNB in that the feedback is routed from the receiving UE2 via the gNB to the retransmitting UE1, while in the out-of-coverage scenario, the synchronous HARQ system operates independent from the gNB and a feedback is provided directly from the UE2 to the UE1. The transmitting UE1 may be scheduled a SL grant, by the gNB, or may choose a resource for an autonomous transmission. Based on the initial transmission, the retransmission is performed on the same frequency resource or on a preconfigured hopping pattern after a fixed or preconfigured time, like the RTT (see FIG. 6(*b*)). The retransmissions are continued periodically until an acknowledgement message is received, either from the gNB, for example via the PDCCH being relayed from UE2, or from the receiving UE2 directly, for example via the PSCCH or until the maximum number of retransmissions is reached.

In the following, embodiments supporting asynchronous HARQ in the sidelink and supporting synchronous HARQ in the sidelink are described in more detail as well as approaches for transmitting the HARQ feedback.

Asynchronous HARQ for the Sidelink

Figure 7:
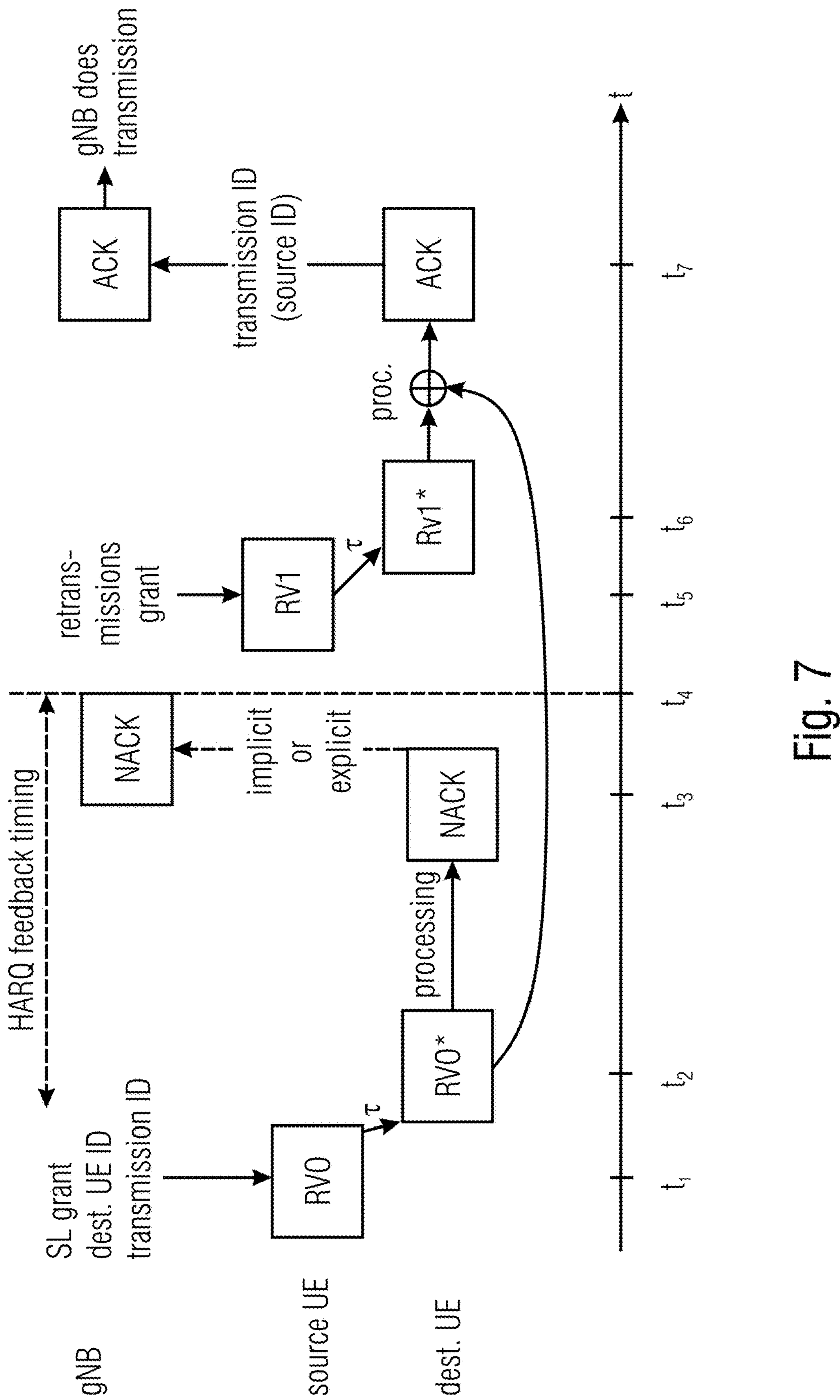
FIG. 7 shows a timeline of an asynchronous HARQ transmission in a SL in accordance with embodiments of the present invention.

The asynchronous HARQ is fully controlled by the gNB and offers, when compared to the synchronous HARQ, a higher flexibility, however, it is needed that all transmission and retransmissions are scheduled by the gNB. FIG. 7 shows a timeline of an asynchronous HARQ transmission in a SL in accordance with embodiments of the present invention. In the vertical direction, the gNB, the source or transmitting UE and the destination or receiving UE are depicted, and in the horizontal direction the time line is indicated.

Initially, the gNB issues a sidelink grant to the source UE, which includes the identifier for the destination UE ID or a RNTI associated to the destination UE ID and a transmission ID, also designated as the HARQ process number of the transmitting UE. The destination UE ID or the RNTI are optional, since depending on the mode of operation the gNB might not be aware of to which UE the transmission is to be sent. The source UE performs the initial transmission, referred to as redundancy version RV0 at a time $t_1$. The transmission is received at the destination UE at a time $t_2$, which is indicated as the RV0*. At the destination UE the received data is processed, and in case it is determined that the transmission was not successful, for example because it is not possible to fully decode the information, at a time $t_3$ an implicit or explicit non-acknowledgment message NACK is transmitted to the gNB, which receives the feedback before or at the time $t_4$. The time period between $t_1$ and $t_4$ may be referred to as the HARQ feedback timing. At a time $t_5$, the gNB issues to the source UE the retransmission grant for transmitting a redundancy version of the initial transmission referred to as RV1 which, at a time $t_6$ is received at the destination UE as is indicated by RV1*. The destination UE also buffers the initially received transmission RV0*, and processes the initially received data RV0* and the retransmitted data RV1*. In FIG. 7 it is assumed that on the basis of this now available data, the transmission can be correctly processed, like decoded, so that at a time $t_7$, the destination UE issues an acknowledgement message ACK that may include the transmission ID and an ID of the source UE, like the RNTI. The acknowledgement message is received at the gNB, and in case the source UE has additional data to be transmitted, the gNB may issue a further SL grant for a transmission of new data.

Thus, in accordance with embodiments, the ID of the receiver UE may be provided in a sidelink unicast grant issued by the gNB. This avoids an overload situation at the destination UE in case there are several UEs transmitting to a single destination UE. Therefore, for a unicast or a groupcast communication over a sidelink using asynchronous HARQ in the sidelink, embodiments of the invention suggest an additional DCI format in the PDCCH for signaling the sidelink grants which may indicate the identity of one or more destination UEs. FIG. 8 illustrates a DCI format for scheduling a sidelink communication as explained above with reference to FIG. 7 in accordance with an embodiment of the present invention. At 400, the additional information indicating the receiver UE ID or group destination ID is indicated. The receiver UE ID may be the RNTI, the radio network temporary identifier.

In accordance with further embodiments, the sidelink grant may also include the HARQ process ID. The gNB, as explained above with reference to FIG. 7, upon granting a sidelink communication, may indicate the HARQ process ID to be used in the DCI together with a sidelink resource allocation. This enables a distinct identification to which transmission the grant belongs. Also, the maximum number of transmissions for the SL HARQ may be configured by the gNB. For example, this may be signaled as maxHARQSL-Tx in the MAC-MainConfigSL IE which is contained in the SL-CommConfig IE, information element. FIG. 9 illustrates an embodiment of a SL-CommConfig information element, IE, modified in accordance with the inventive approach and indicating at 402 the above-mentioned maxHARQSL-Tx indicating the maximum number of transmissions for the SL HARQ.

FIG. 10 illustrates a DCI format modified in accordance with embodiments of the present invention to be used for scheduling. The modified DCI format includes, as is indicated at 404, the HARQ process ID of the transmitter, namely the transmitting UE which may be in a range between 0 and maxHARQSL-Tx−1, which is indicated in the modified SL-CommConfig information element depicted in FIG. 9.

FIG. 11 illustrates a SCI format modified in accordance with embodiments of the present invention for scheduling unicast/groupcast transmissions using HARQ over the sidelink. At 406 the additional information provided in the SCI as indicated, namely the source UE ID, like the RNTI, the destination UE ID, like the RNTI, or the group destination ID, the HARQ process ID of the source UE, the new data indicator, and the redundancy versions. The destination IDs may be signaled explicitly or may be signaled implicitly by CRC scrambling, such that the receiving UE recognizes its SCIs by blind decoding and comparing to the descrambled check sum by using its own ID.

In accordance with embodiments, an implicit non-acknowledgement of a non-successful transmission of data may be implemented. To reduce an increase of overhead signaling, the destination UE may skip the NACK transmission to the gNB for the sidelink transmission, and only the acknowledgment message is explicitly signaled to the gNB within the HARQ timing interval. No retransmission will be scheduled by the gNB for the asynchronous HARQ operation once the ACK message is received. On the other hand, to issue the retransmission, the gNB waits for a preconfigured or fixed amount of time, which may also be known at the destination UE, during which a feedback signaling is expected, for example in the next available PUCCH or PUSCH occasion, or in PUCCH or PUSCH explicitly occasions signaled with the grant by the gNB to the source UE and forwarded to the destination UE in SCI, or in PUCCH and PUSCH occasions explicitly signaled directly to the destination UE for SL feedback. In case this signaling is not received because the destination UE could not decode the transmission or missed the sidelink transmission, the gNB controls the source UE to perform a retransmission with the same or changed parameters, for example with a different redundancy version and a different resource allocation. FIG. 12 illustrates an RRC signaling as used in the inventive system which has been modified in accordance with embodiments of the present invention so as to specify the number of subframes within which an explicit acknowledgement has to be delivered, as is indicated at 408 by the parameters s1-DataToUL-ACK-max.

In accordance with the further embodiments, the HARQ feedback, either the acknowledgement message or the non-acknowledgment message, may include the HARQ process ID and the source UE ID, if the HARQ feedback transmission resource for a specific transmission is not indicated distinctly. Contrary to conventional transmissions in the downlink or uplink between a base station and a UE, in a sidelink communication, the bit position or timing of the HARQ feedback may not be sufficient for assigning to a certain transmission so that, in accordance with embodiments, the destination UE indicates, for example, in the PUCCH or in the PUSCH transmission, which may include the feedback for one or more transmissions, the actual HARQ process ID and the source UE ID to allow for a distinction of the respective identifications at the gNB. The HARQ process ID may be the HARQ process ID provided by the gNB for the retransmission.

In accordance with further embodiments, a dedicated PUCCH resource may be provided for the feedback. In accordance with such embodiments, the gNB may provide, in addition to the grant to the source UE, the uplink control resources, like the PUCCH or PUSCH resources, to the destination UE so that the UE is aware of the resources to be used for transmitting the feedback to the gNB.

Synchronous HARQ for the Sidelink Communication

Figure 13:
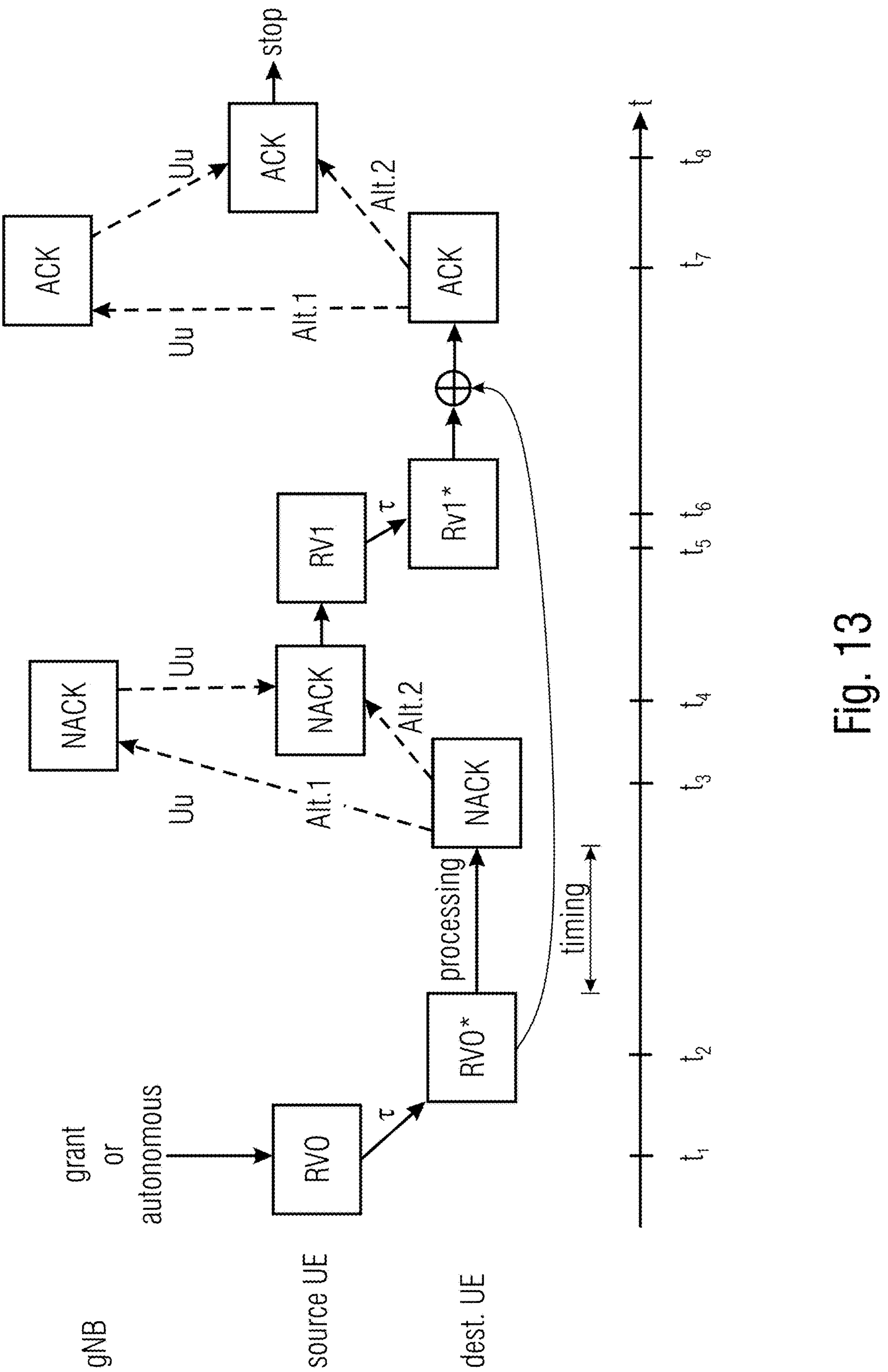
FIG. 13 illustrates a synchronous HARQ transmission in a sidelink in accordance with embodiments of the present invention.
Figure 20:
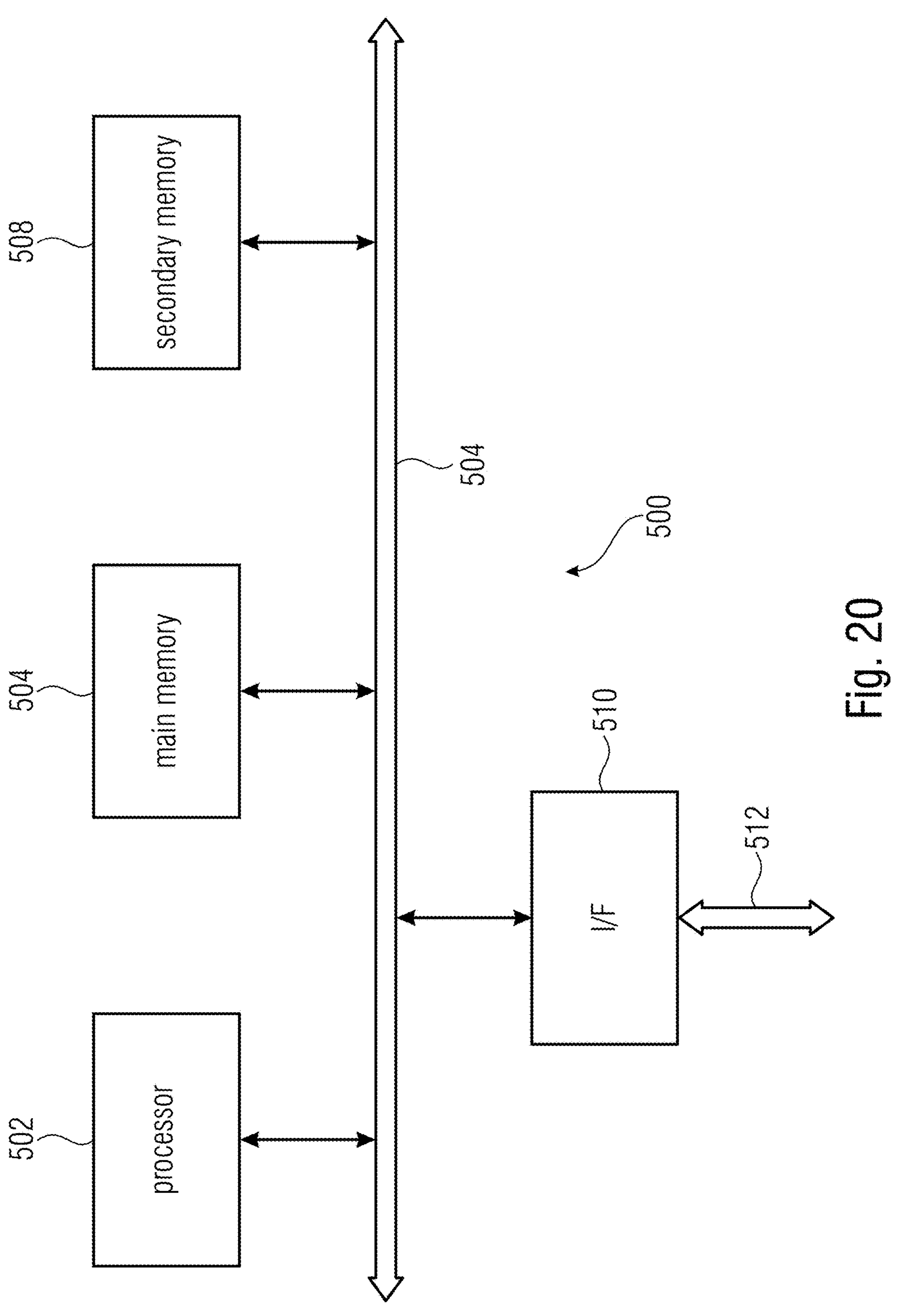
FIG. 20 illustrates an example of a computer system on which units or modules as well as the steps of the methods described in accordance with the inventive approach may execute.

The synchronous HARQ procedure may be operated, in accordance with embodiments of the present invention, both in in-coverage and out-of-coverage scenarios, i.e., for UEs operating in mode 4 or operating autonomously. FIG. 13 illustrates a synchronous HARQ transmission in a sidelink in accordance with embodiments of the present invention. Similar as in FIG. 7, the vertical direction indicates the gNB, the source UE and the destination UE, and the horizontal direction indicates the timeline.

At a time $t_1$, the source UE, either responsive to a grant from the gNB or autonomously, initiates an initial transmission of data referred to as redundancy version RV0. At a time $t_2$, the transmission is received at the destination UE as RV0* and is processed which takes a certain time until a time $t_3$. It is assumed that the transmission was not successful so that at the time $t_3$ the non-acknowledgement is transmitted which is received at the source UE at a time $t_4$. In case the UEs operate in an in-coverage scenario, i.e., there is a connection to the gNB, the NACK message is transmitted at the time $t_3$ to the gNB, and the gNB informs the source UE about the receipt of the NACK message accordingly. In case the UEs operate autonomously, i.e., in an out-of-coverage scenario, the NACK message is signaled at the time $t_3$ via the sidelink back to the source UE. In either case, at a time $t_5$ the source UE causes a retransmission of the data, for example by transmitting redundancy version RV1 of the data to be transmitted to the destination UE where it is received as RV1* at a time $t_6$. The destination UE, in a similar way as described above with reference to FIG. 7, buffers the incomplete or non-successfully received data RV0* and, combines the initially received data RV0* and the retransmission RV1*. In FIG. 13 it is assumed that on the basis of the now available information, a successful decoding of the data is possible so that the destination UE, at a time $t_7$, issues an acknowledgement message to the source UE, either via the gNB, in case of in-coverage UEs, or directly via the sidelink, in case of out-of-coverage UEs. Responsive to receiving the acknowledgement message at a time $t_8$, the source UE stops the retransmissions and, if further data needs to be transmitted, may initiate a new initial transmission.

In accordance with embodiments, when considering in-coverage-scenarios, the feedback may be provided from the destination UE to the source UE via the gNB. For this feedback, a dedicated PUCCH resource may be used. The gNB, in addition to the issuing the grant for the sidelink communication to the source UE may also indicate to the destination UE uplink control resources, for example PUCCH resources, to be used for transmitting the feedback to the gNB. In accordance with other embodiments, the PUCCH resources may be obtained from a unique mapping of the timing and/or PRB of the initial transmission to one PUCCH resource.

In accordance with embodiments, an implicit non-acknowledgement message and an explicit acknowledgement message may be provided via the gNB. In a similar way as described above, to reduce an additional increase in signaling overhead, the destination UE may skip the NACK transmission to the gNB for a sidelink transmission, and in case no acknowledgment message is received within a predefined time period or at a certain time, as also described above, the gNB assumes a non-successful transmission and controls the source UE to carry out a retransmission. For the synchronous HARQ, the gNB may forward the acknowledgement message together with the HARQ process ID or transmission ID explicitly, if this is not implied by the timing of the forwarded acknowledgement message, on the PDCCH to the source UE.

In accordance with further embodiments, the respective acknowledgement/non-acknowledgement messages or the feedback may be provided with the source UE ID. As mentioned above, other than in unicast downlink and uplink transmissions between a UE and a base station, in the sidelink communication, the bit position or timing of the HARQ feedback may not be sufficient for assigning to a certain transmission so that in accordance with embodiments, the destination UE may indicate in the PUCCH or in the PUSCH transmission, which contains the feedback for one or more transmissions, also the source UE ID so as to allow for a distinct identification at the gNB. In combination with a timing of the feedback reporting this allows identifying the corresponding transmission.

In accordance with further embodiments, rather than using a feedback via the gNB, also a direct feedback may be implemented, both for in-coverage and out-of-coverage scenarios. In accordance with embodiments, a dedicated PSCCH resource may be provided for the feedback. The frequency and resource timing of the initial transmission, either grant based from the gNB or autonomously, uniquely maps to a PSCCH region for providing the feedback. This may be, for example, the same frequency location or frequency location shifted by an offset after t timeslots, where t is the HARQ feedback timing. These parameters may either be preconfigured, for example by an RRC signaling, or may be fixed in the specification so that these parameters are known both to the source UE and to the destination UE.

In accordance with further embodiments, a direct SCI format including the source UE ID and the HARQ feedback may be provided. The feedback may be provided using an SCI format modified in accordance with embodiments of the present invention so as to include the HARQ feedback and the source UE ID which allows the transmitter or source UE to uniquely identify the feedback based on its ID and the feedback transmission time. FIG. 14 illustrates a SCI format modified in accordance with embodiments of the present invention for HARQ feedback reporting for a unicast transmission, and, as is indicated at 410, the modified SCI format 2A now includes fields referring to the source UE ID, for example, the RNTI, and to the HARQ feedback. The field referring to the source UE ID in SCI format 2A may also be signaled implicitly by CRC scrambling, such that the source UE ID discovers a corresponding SCI by blind decoding with its own UE ID.

FIG. 15 illustrates a SCI format modified in accordance with embodiments of the present invention for a HARQ feedback reporting a groupcast transmission and including as new fields the source UE ID, for example the RNTI, the destination UE ID or group ID and the HARQ feedback, as is indicated at 412.

In accordance with further embodiments, an implicit non-acknowledgement message and an explicit acknowledgement message may be provided via the sidelink control channel. To provide a reliable transmission and increase the sufficiency further, an implicit NACK procedure for synchronous HARQ may be used. This addresses the problem that transmissions may be missed and, at the same time, reduces overhead. The explicit ACK via the SL may contain the source UE ID and the HARQ process ID/transmission ID, and the explicit ACK may be transmitted on the PSCCH either on a predefined resource, for example, based on a fixed or preconfigured timing and the corresponding transmission, or randomly on a resource in a certain time slot or within a certain time interval, as described above with reference to the HARQ feedback timing, using blind decoding with the destination UE ID at the transmitter part.

In accordance with further embodiments, the HARQ interval, like the RTT, may be fixed or semi-statically configured. The HARQ interval may also be referred to as a sidelink HARQ timeline, which indicates a time of sending the feedback and a time of sending the retransmission. The source UE may automatically retransmit a transport block, TB, according to a preconfigured or default RV order on the same frequency resources or using a fixed or preconfiguring hopping pattern following the HARQ interval, also referred to as the sidelink HARQ interval. The HARQ sidelink interval may be different from the HARQ interval, RTT, as it is used for conventional uplink and downlink transmissions between a UE and a base station, and it may either be fixed or semi-statically for the sidelink, for example by RRC signaling. For in-coverage scenarios, the gNB may indicate, for example in the DCI or using the RRC signaling, to use a different sidelink HARQ interval in the sidelink for specific transmissions, for example a shorter interval for URLLC services, and a long interval for delay non-critical services, like eMBB. Further, a sidelink HARQ interval may be configured or fixed for out-of-coverage and/or for a default operation. For example, the HARQ RTT may be selected from a plurality of pre-configured HARQ RTTs In accordance with further embodiments, the HARQ approach and an SPS interval sensing may implemented for mode 4 UEs. Mode 4 UEs in V2X or autonomous UEs perform a sensing to determine an available transmission location and extrapolate it into the future. This is also applied for the sidelink HARQ retransmission and using the default sidelink HARQ interval, the UE may extrapolate the HARQ retransmission process. Optionally it may be assumed that a maximum number of retransmissions is used.

In accordance with embodiments, the second UE may bundle a plurality of HARQ feedbacks, both for synchronous and asynchronous HARQ and transmit them together on a single PUCCH, PUSCH or PSSCH resource.

CQI Reporting on SL Transmissions

In accordance with further embodiments, for example, for adapting the MCS of a current link, a channel quality indicator, CQI, reporting indicative of the channel quality on the SL, may be implemented on the basis of past SL transmissions and/or on the basis of channel state information reference symbols, like CSI-RS. It is noted that, in accordance embodiments, the CQI reporting may be apply in combination with the above mentioned synchronous and asynchronous HARQ processes on the SL. However, the invention is not limited to such embodiments. Rather, in accordance with other embodiments, the CQI reporting may be applied to SL communications not implementing HARQ or another retransmission protocol.

In accordance with embodiments, the CSI-RS request may be provided together with the SL grant by a gNB. The gNB may issue, for example, via the PDCCH, together with the SL grant, a CSI-RS on all or a subset of the sidelink resources during a part of the duration of the time slot, and the source UE, transmitting its data and a CSI-RS, may indicate the CSI-RS transmission in the corresponding SCI. FIG. 16 illustrates an example of a DCI format modified in accordance with embodiments of the present invention for issuing a CSI-RS together with the SL grant. As is indicated at 414, the format includes the CSI-request having a length of a certain number of bits so as to specify the CSI transmission parameters, like the band, different subsets and the like.

FIG. 17 illustrates a SCI format modified in accordance with embodiments of the present invention indicating the CSI-RS transmission. As is indicated at 416, the SCI format includes the additional fields indicating the source UE ID, like RNTI, and the CSI request.

In accordance with further embodiments, the reporting of the CQI to the gNB may be based on past transmissions or on a CSI-RS with HARQ feedback. In accordance with such embodiments, the UE may include CQI signaling in the HARQ feedback reporting to the gNB based on reference signals included in an associated transmission, like the transmission of DMRS. The CQI signaling may be transmitted on the PUCCH together with the information of the source and destination UEs explicitly, if this information is not signaled implicitly by the timing and the resource used for the transmission of HARQ feedback and the CQI report. The report may be activated, for example by RRC signaling or by recognizing a CSI-RS transmission which is indicated in the corresponding SCI.

In accordance with yet further embodiments, a direct CQI reporting based on the CSI-RS with HARQ feedback may be implemented. The source UE may use a dedicated time slot or resource to transmit the CSI-RS on the sidelink, for example responsive to the grant by a gNB or autonomously when being out-of-coverage. On the sidelink control channel, the CSI-RS may be announced using an SCI format being modified in accordance with embodiments of the present invention so as to include the source UE ID. Optionally, also the destination UE ID may be included. The one or more destination UEs answer the CSI-RS with a CQI report on the sidelink control, using for example, the PSCCH, via a SCI or on a dedicated PSSCH resource indicated in the PSSCH via the SCI.

FIG. 18 illustrates a SCI format modified in accordance with embodiments of the present invention for indicating a CSI-RS transmission and including, as is indicated at 418 the additional fields specifying the source UE ID, the destination UE ID, if needed, and the CSI request.

FIG. 19 illustrates a SCI format modified in accordance with the embodiments of the present invention for a HARQ feedback and a CQI measurement reporting. The SCI format includes, as is indicated at 420 the additional fields indicating the source UE ID, the HARQ feedback and the CQI measurement report.

In accordance with further embodiments a buffer status report, BSR, may be used in the system that includes destinations. Conventionally, for the request grants for the SL, the UE sends a BSR telling the amount of data per logical channel group in the buffer to the BS. In case, like in NR, that only 8 logical channel groups are provided, this is not sufficient for SL. However, for the link adaption considering, e.g., CQI reporting or for issuing scheduling grants with a specific destination, the gNB needs to know the intended destinations. For that purpose, embodiments provide a new BSR telling the amount of data in the buffer per destination per logical channel group, for example as follows:

BSR per Logical Channel Group:

Broadcast—10 Bytes
GroupID1—20 Bytes
UE-ID20—40 Bytes
UE-ID10—30 Bytes

In some of the embodiments described above, reference has been made to respective vehicles being either in the connected mode, also referred to as mode 3 configuration, or vehicles being in the idle mode, also referred to as mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also in such scenarios, scheduling the resources in accordance with the aspects described above is advantageous as it allows for a more efficient scheduling of resources for sidelink communication avoiding resource collisions and the like.

Some embodiments of the present invention have been described above with reference to a communication system in which the transmitter is a base station serving a user equipment, and in which the receiver is the user equipment served by the base station. However, the present invention is not limited to such embodiments and may also be implemented in a communication system in which the transmitter is a user equipment station, and in which the receiver is the base station serving the user equipment. In accordance with other embodiments, the receiver and the transmitter may both be UEs communicating directly with each other, e.g., via a sidelink interface.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A wireless communication system, comprising:

a plurality of communication devices, wherein the plurality of communication devices includes at least a first User Equipment (UE) and a second UE, wherein the first UE and the second UE are configured for a sidelink communication with each other, wherein the first UE and the second UE are configured to schedule resources for the sidelink communication autonomously, wherein the first UE transmits data packets to the second UE via the sidelink;

wherein the wireless communication system is configured to support a retransmission protocol for the sidelink, wherein the retransmission protocol comprises:

enabling the first UE to perform a retransmission for a data packet upon receipt of an implicit or explicit non-acknowledgement (NACK) message from the second UE, enabling the first UE to repeat the retransmission until a maximum number of retransmissions have been sent, and enabling the first UE to cease the repeated retransmission upon receipt of an acknowledgement (ACK) message of a successful receipt from the second UE, whichever occurs first, wherein the first UE schedules resources for the sidelink communication by:

sensing to determine a first available transmission location, extrapolating from the determined first available transmission location, subsequent available transmission locations using a hybrid automatic repeat request roundtrip time (HARQ RTT), wherein the HARQ RIT is selected from a plurality of pre-configured HARQ RTTS.

2. The wireless communication system of claim 1, wherein the first UE extrapolates the available subsequent locations to accommodate a maximum number of retransmissions.

3. The wireless communication system of claim 1, wherein the implicit or explicit NACK and ACK messages from the second UE are communicated using an SCI element, and wherein the SCI element identifies the first UE, thereby enabling the first UE to identify the NACK and ACK messages from the second UE at an allocated location.

4. The wireless communication system of claim 1, wherein the first UE is configured to automatically retransmit a transport block (TB), wherein the retransmission is based on a preconfigured or default transmission order, wherein the transmission order identifies a frequency resource or a fixed or preconfigured hopping pattern according to a sidelink hybrid automatic repeat request (HARQ) timeline, wherein the sidelink HARQ timeline indicates a time of sending the retransmission, and a time of sending the ACK message.

5. The wireless communication system of claim 1, wherein the resources for the sidelink communication comprise a default sidelink hybrid automatic repeat request (HARQ) timeline.

6. The wireless communication system of claim 1, wherein a destination ID may be signaled implicitly by CRC scrambling, such that the second UE recognizes its Sidelink Control Information (SCI) by blind decoding.

7. A method of communicating between a first User Equipment (UE) and a second UE, comprising:

autonomously scheduling of the first UE, resources for a sidelink communication between the first UE and the second UE, transmitting, from the first UE, data packets to the second UE via the sidelink;

enabling the first UE to perform a retransmission for a data packet upon receipt of an implicit or explicit non-acknowledgement (NACK) message from the second UE, enabling the first UE to repeat the retransmission until a maximum number of retransmissions have been sent, and enabling the first UE to cease the repeated retransmission upon receipt of an acknowledgement (ACK) message of a successful receipt from the second UE, whichever occurs first, wherein the first UE schedules resources for the sidelink communication by:

sensing to determine a first available transmission location, extrapolating from the determined first available transmission, subsequent available transmission locations using a hybrid automatic repeat request roundtrip time (HARQ RTT), wherein the HARQ RTT is selected from a plurality of pre-configured HARQ RTTS.

8. The method of claim 7, wherein the first UE extrapolates the available subsequent locations to accommodate a maximum number of retransmissions.

9. The method of claim 7, wherein the implicit or explicit NACK and ACK messages from the second UE are communicated using an SCI element, and wherein the SCI element identifies the first UE, thereby enabling the first UE to identify the NACK and ACK messages from the second UE at an allocated location.

10. The method of claim 7, wherein the first UE is configured to automatically retransmit a transport block (TB), wherein the retransmission is based on a preconfigured or default transmission order, wherein the transmission order identifies a frequency resource or a fixed or preconfigured hopping pattern according to a sidelink hybrid automatic repeat request (HARQ) timeline, wherein the sidelink HARQ timeline indicates a time of sending the retransmission, and a time of sending the ACK message.

11. The method of claim 7, wherein the resources for the sidelink communication comprise a default sidelink hybrid automatic repeat request (HARQ) timeline.

12. The method of claim 7, wherein a destination ID may be signaled implicitly by CRC scrambling, such that the second UE recognizes its Sidelink Control Information (SCI) by blind decoding.

13. A non-transitory computer-readable medium comprising a program that, when executed by a processing system of a first User Equipment (UE), causes the processing system to:

autonomously schedule resources for a sidelink communication between the first UE and a second UE, transmit data packets to the second UE via the sidelink;

perform a retransmission for a data packet upon receipt of an implicit or explicit non-acknowledgement (NACK) message from the second UE, repeat the retransmission until a maximum number of retransmissions have been sent, and cease the repeated retransmission upon receipt of an acknowledgement (ACK) message of a successful receipt from the second UE, whichever occurs first, wherein the program causes the processing system to schedule resources for the sidelink communication by:

sensing to determine a first available transmission location, extrapolating from the determined first available transmission location, subsequent available transmission locations using a hybrid automatic repeat request roundtrip time (HARQ RTT), wherein the HARQ RTT is selected from a plurality of pre-configured HARQ RTTS, wherein the first UE extrapolates the available subsequent locations to accommodate a maximum number of retransmissions.

14. The medium of claim 13, wherein the resources for the sidelink communication comprise a default sidelink hybrid automatic repeat request (HARQ) timeline.

15. The medium of claim 13, wherein a destination ID may be signaled implicitly by CRC scrambling, such that the second UE recognizes its Sidelink Control Information (SCI) by blind decoding.

* * * * *